US012620756B2

(12) United States Patent
Yang

(10) Patent No.: US 12,620,756 B2
(45) Date of Patent: May 5, 2026

(54) CABLE CONNECTOR

(71) Applicant: IPEX TECHNOLOGIES INC.

(72) Inventor: Tianyuan Yang, Kingston (CA)

(73) Assignee: IPEX TECHNOLOGIES INC, Mississauga (CA)

( * ) Notice: Subject to any disclaimer, the term of this patent is extended or adjusted under 35 U.S.C. 154(b) by 350 days.

(21) Appl. No.: 18/428,508

(22) Filed: Jan. 31, 2024

(65) Prior Publication Data

US 2025/0079757 A1 Mar. 6, 2025

(30) Foreign Application Priority Data

Aug. 29, 2023 (CA) ..................................... 3210532

(51) Int. Cl.
*H01R 13/59* (2006.01)

(52) U.S. Cl.
CPC .................................... *H01R 13/59* (2013.01)

(58) Field of Classification Search
None
See application file for complete search history.

(56) References Cited

U.S. PATENT DOCUMENTS 3,062,475 A 11/1962 Miller, Jr.
4,030,741 A 6/1977 Fidrych
4,145,075 A * 3/1979 Holzmann ........... H02G 3/0658 439/461
4,250,348 A * 2/1981 Kitagawa .................. F16L 5/06 285/322
4,390,142 A 6/1983 Cheng
4,510,798 A 4/1985 Prussin et al.
4,781,617 A * 11/1988 Alibert ................... H01R 13/59 439/461
4,787,657 A * 11/1988 Henniger ............. H02G 3/0658 285/323
5,350,204 A * 9/1994 Henniger .................. F16L 5/08 174/665
5,405,172 A * 4/1995 Mullen, Jr. .......... H02G 3/0675 285/343

(Continued)

FOREIGN PATENT DOCUMENTS

CA 2949715 9/2017
CA 171135 11/2017

(Continued)

*Primary Examiner* — Tho D Ta

(57) ABSTRACT

A cable connector having a lock nut and a connector body can accommodate strain relief elements, such as grommets, for securing different types of cables. The connector body has two or more axially extending fingers axially coincident with the grommet. Each finger is connected to the connector body by at least two radially separated discrete tabs forming an axial separation between the connector body and the associated finger. Relative axial movement of the lock nut towards the connector body causes radial contraction of the axially extending fingers from the first rest position to a second contracted position where the axially extending fingers have translationally radially contracted to compress the grommet about the cable inserted in the cable connector. Different types of grommets, some with plastic inserts, can be interchangeably used with the same connector body to accommodate cables of different sizes and shapes.

20 Claims, 16 Drawing Sheets

(56) References Cited

U.S. PATENT DOCUMENTS

| | | | | |
|---|---|---|---|---|
| 5,873,540 | A | 2/1999 | Hardin | |
| 5,927,892 | A * | 7/1999 | Teh-Tsung | H02G 3/0675 403/259 |
| 6,234,418 | B1 | 5/2001 | Donaldson | |
| 6,966,791 | B1 | 11/2005 | Farr | |
| 7,077,693 | B1 | 7/2006 | Symons | |
| D539,117 | S | 3/2007 | Sealey | |
| D542,123 | S | 5/2007 | Symons | |
| D554,017 | S | 10/2007 | Hampton | |
| 7,399,199 | B2 | 7/2008 | Symons | |
| D591,678 | S | 5/2009 | Whitley | |
| 7,654,484 | B2 | 2/2010 | Mogensen | |
| 7,686,830 | B2 | 3/2010 | Collier | |
| D631,730 | S | 2/2011 | Skillman | |
| D644,306 | S | 8/2011 | Douglass, III | |
| D645,334 | S | 9/2011 | Kanemitsu | |
| D685,771 | S | 7/2013 | Bertenlhal | |
| 8,474,105 | B2 | 7/2013 | Naquin | |
| 8,490,513 | B2 * | 7/2013 | Chiou | F16C 1/102 277/606 |
| D716,640 | S | 11/2014 | Martinson | |
| D722,621 | S | 2/2015 | Gray | |
| D735,020 | S | 7/2015 | Bradford | |
| 9,187,291 | B2 | 11/2015 | Alexandre | |
| D748,455 | S | 2/2016 | Symons | |
| 10,141,686 | B2 | 11/2018 | Martino | |
| D958,480 | S | 7/2022 | Kanemitsu | |
| 2002/0145073 | A1 | 10/2002 | Swanson | |
| 2003/0122023 | A1 | 7/2003 | Pitcher | |
| 2004/0178398 | A1 | 9/2004 | Miller | |
| 2006/0219437 | A1 * | 10/2006 | Chiu | H02G 3/088 174/653 |
| 2011/0036676 | A1 | 2/2011 | Skillman | |
| 2011/0198110 | A1 | 8/2011 | Fujita | |
| 2015/0200530 | A1 | 7/2015 | Chiu | |

FOREIGN PATENT DOCUMENTS

| | | | | |
|---|---|---|---|---|
| CA | 171777 | | 11/2017 | |
| CA | 174255 | | 11/2017 | |
| CA | 174458 | | 11/2017 | |
| CA | 174459 | | 11/2017 | |
| CN | 102545112 | A * | 7/2012 | H02G 3/0675 |
| CN | 210780042 | U * | 6/2020 | H02G 3/0675 |
| DE | 19544963 | | 6/1997 | |
| DE | 20010394 | | 9/2000 | |
| DE | 102011089961 | | 6/2013 | |
| DE | 102012019758 | A1 * | 4/2014 | F16L 5/06 |
| DE | 102016120039 | | 4/2018 | |
| EP | 0218116 | | 4/1987 | |
| EP | 0579125 | | 1/1994 | |
| EP | 0627588 | | 12/1994 | |
| EP | 2775579 | | 9/2014 | |
| EP | 2793334 | | 10/2014 | |
| EP | 2950125 | A1 * | 12/2015 | G02B 6/44785 |
| FR | 2812134 | A1 * | 1/2002 | H01R 13/59 |
| FR | 2946809 | A1 * | 12/2010 | H02G 3/0675 |
| WO | WO00/31846 | | 6/2000 | |

* cited by examiner

CABLE CONNECTOR

FIELD OF THE INVENTION

This invention relates to cable connectors for receiving a cable. In particular, this invention relates to strain relief cable connectors which may be used with different types of grommets to resist or reduce axial movement of the inserted cable with respect to the connector.

BACKGROUND OF THE INVENTION

In the past, there have been many different types of cable connectors to connect or terminate a variety of cables, such as electrical power cables, communication signal cables, and other types of cables. Such connectors may include a strain relief element for facilitating securing the cables to the connectors. Such strain relief elements may comprise a number of components, including grommets, which in their simplest form prevent, or reduce, the likelihood of an insert cable passing therethrough from chafing or bending during use. Grommets may also resist, or reduce, the possibility of the cable being pulled out of the electrical connector.

Some of the prior cable connectors and grommet combinations have suffered from the disadvantage that it is difficult to accommodate inserted cables of different sizes and shapes. This has restricted use of the cable connectors and grommets, or, required different cable connector and grommet combinations for each corresponding size or shape of cable, increasing the cost of manufacture, use and storage of such prior cable connector and grommet combinations.

Other difficulties with prior art connectors is that, in many cases, the constricting mechanisms consist of prongs or tongues which move in unison, such as in U.S. Pat. No. 4,787,657 or U.S. Pat. No. 5,350,204 to Dieter Henniger. This results in a more intricate and delicate arrangement of tongues or prongs that may require interaction and may become easily damaged, or, dirty during use or storage which may inhibit their use.

Furthermore, some prior art connectors generally have tongues or prongs that are pivotably mounted to a body. This pivoting action inherently decreases the surface contact area between the pivotally connected prongs or tongues with the corresponding sealing method.

SUMMARY OF THE INVENTION

Accordingly, it is an object of this invention to at least partially overcome some of the disadvantages of the prior art. Also, it is an object of this invention to provide an improved type of cable connector which is simple to assemble and prevents, or reduces, axial movement of the inserted cable with respect to the cable connector.

Accordingly, in one of its aspects, this invention resides in a cable connector for receiving a cable, said cable connector comprising: connector body having a connector bore extending therethrough from a receiving opening to an exiting opening; a lock nut for engaging the connector body and axially moveable relative to the connector body when engaged therewith; at least two axially extending fingers, each of said axially extending fingers extending axially from a connector end, proximate the connector body, to a distal end, distant from the connector body, and wherein the connector end of each axially extending finger is connected to the connector body by at least two radially separated discrete tabs, said discrete tabs forming an axial separation between the connector body and the connector end of the associated axially extending fingers; a grommet axially coincident with the axially extending fingers, said grommet having a grommet bore communicating with the connector bore of the connector body permitting a cable to pass through the grommet bore and be received by the receiving opening of the connector bore; and wherein relative axial movement of the lock nut toward the connector body causes radial contraction of the axially extended fingers relative to the connector body to compress the grommet located axially coincident with the at least two axially extending fingers.

In a further aspect, the present invention resides in a kit for a cable connector, said kit comprising: connector element having a connector body defining a connector bore extending therethrough from a receiving opening to an exiting opening, and at least two axially extending fingers, each of said axially extending fingers extending axially from a connector end, proximate the connector body, to a distal end, distant from the connector body, and wherein the connector end of each axially extending finger is connected to the connector body by at least two radially separated discrete tabs, said discrete tabs forming an axial separation between the connector body and the connector end of the associated axially extending fingers; a lock nut for engaging the connector body and axially moveable relative to the connector body when engaged therewith; a grommet axially coincident with the axially extending fingers, said grommet having a grommet bore communicating with the connector bore of the connector body permitting a cable to pass through the grommet bore and be received by the receiving opening of the connector bore; and wherein relative axial movement of the lock nut toward the connector body causes radial contraction of the axially extended fingers relative to the connector body to compress the grommet located axially coincident with the at least two axially extending fingers.

In at least one preferred embodiment, the present invention provides for the axially extending fingers to radially contract about the grommet in order to compress the grommet and/or combined grommet/insert so as to frictionally engage a cable that has been inserted into the bore of the grommet. At least two discrete tabs connect each of the fingers to the connector body and facilitate radial compression of the fingers so as to provide a radial compression along the axially coincident grommet bore of the grommet to frictionally hold the inserted cable within the grommet.

A further advantage of at least some embodiments of the present invention is that the tabs connecting the fingers to the body define a space or separation, which may facilitate radial translation of movement of the axially extending fingers. In this way, relative axial movement of the nut towards the body causes the fingers to radially transitionally contract about the grommet. This also increases the potential contact surface area between the fingers and the grommet to improve the restraining compression forces created by the grommet to resist or reduce the possibility of the cable being pulled out of the cable connector.

In at least some embodiments, the fingers move independently from one another and do not interact with each other. This avoids potential damage, or overlap, between the fingers when they are being radially contracted about the axially coincident grommet. Furthermore, this provides a simpler solution which does not require complex interaction between the fingers for operation of the cable connector, providing a more robust cable connector.

In a preferred embodiment, the cable connector may comprise an insert. The insert may be a stand-alone element or may be integrally formed with the grommet, such as by a “two-shot” molding procedure. The “two-shot” molding procedure may involve performing injection molding in two (or more) consecutive cycles. For instance, in the first cycle, a plastic may be injected into a mold that forms the rigid insert portion, and then after the mold is rearranged, a second material is injected to form the flexible portion. In this way the grommet and/or combination of grommet and insert can be shaped to accommodate different sizes and shapes of cables to be inserted into the cable connector while at the same time ensuring the grommet and/or combination grommet and insert may be operatively engaged by the axially extending fingers. The plastic inserts, whether standalone elements or integrally formed with the grommet, facilitate transfer of the compression forces imposed by the lock nut through the fingers to the grommet. The inserts may also bridge the gap between different sizes and shapes of grommets to accommodate cables of different sizes and shapes. The axially extending fingers engage the external surface of the grommet or grommet/insert combination to transfer compression forces when in the contracted position.

In a further preferred embodiment, the cable connector may also comprise a lock nut with a finger engagement surface which initially interacts with a corresponding engagement surface on each of the radially extending fingers. In this way, relative axial movement of the nut toward the connector body causes the lock nut to engage and radially independently move the axially extending fingers.

A further advantage of a least some aspects of the invention relates to the lock nut having a relatively larger axially extending compression surface to axially engage, contract, and compress the fingers. In this way, the lock nut compression surface acting on the outer surface of the fingers increases the axial contact surface upon which radial compression forces are provided by the lock nut on to the grommet through the fingers. As the fingers would generally be made of a type of plastic, similar to the lock nut, relative friction between the external surface of the fingers, the finger engagement surface of the fingers, and the compression surface of the locking nut can be relatively low so as to permit relative movement of the locking nut with respect to the connector body to facilitate movement of the fingers from the first rest position to the a second radially contracted position.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
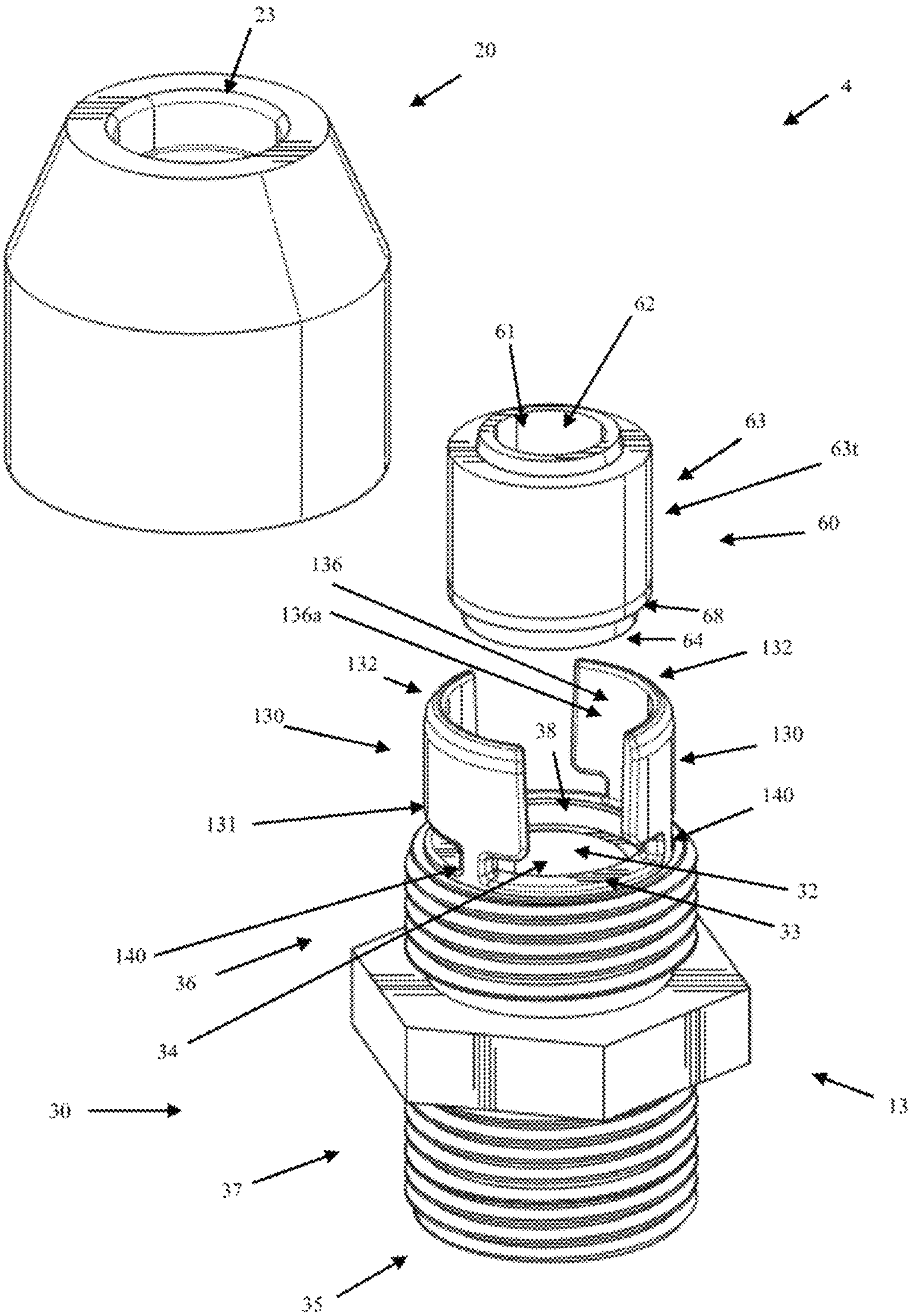
FIG. 1 is a top perspective view of a cable connector in an unassembled configuration according to one embodiment of the present invention showing the lock nut, connector element and grommet.

Preferred embodiments of the invention and its advantages can be understood by referring to the present drawings. In the present drawings, like numerals are used for like and corresponding parts of the accompanying drawings.

One or more of the preferred embodiments described herein relates to a cable connector for terminating or receiving cables, such as electrical and communication cables.

More specifically, the described cable connectors may include a grommet having a central bore therethrough for receiving a cable. Consistent with preferred embodiments described herein, the grommet may include a resilient or flexible portion extending about the grommet bore for engaging the inserted cable to provide a scaling interface between the flexible portion and the inserted cable. Different shaped grommets may be used to accommodate different sized and shaped cables. In some preferred embodiments, the grommet may comprise grommet/insert combinations having a first flexible portion, about the grommet bore, to engage the inserted cable, and a second rigid portion forming an outer surface of the grommet. The grommet may be received in a connector body. The connector body may comprise a grommet seat for engaging a corresponding body engagement surface of the grommet. The grommet bore communicates with a connector bore of the connector body permitting the inserted cable to pass through the grommet bore and be received by the receiving opening of the connector bore. The connector may also have at least two axially extending fingers with each of the axially extending fingers extending axially from a connector end to a distal end, axially distant or remote from the connector end. The connector end of each axially extending finger is preferably connected to the connector body by at least two radially separated discrete tabs. In one preferred embodiment, the radially separated discrete tabs form an axial space or separation between the connector body and the connector end of the associated axially extending fingers. When assembled, the grommet sits in the grommet seat and is axially coincident with the axially extending fingers. Axial movement of the lock nut towards the connector body causes the lock nut to operatively engage and radially contract the axially extending fingers relative to the connector body to compress the grommet located axially coincident with the axially extending fingers. This radial contraction moves the axially extending fingers from a first rest position, permitting insertion of the cable into the grommet, to a second contracted position, where the axially extending fingers have translationally radially contracted to compress the grommet about the cable inserted in the cable connector. Thus, the flexible portion extending about the grommet bore may be compressed about the inserted cable to provide a better sealing interface and friction fit between the grommet and the inserted cable. Any, excess compressed material from the grommet may flow to a tubular portion of the lock nut near the opening. This may prevent or reduce the likelihood that the inserted cable may be pulled-out of the cable connector and also decreasing the likelihood of the cable chafing or bending.

Figure 2:
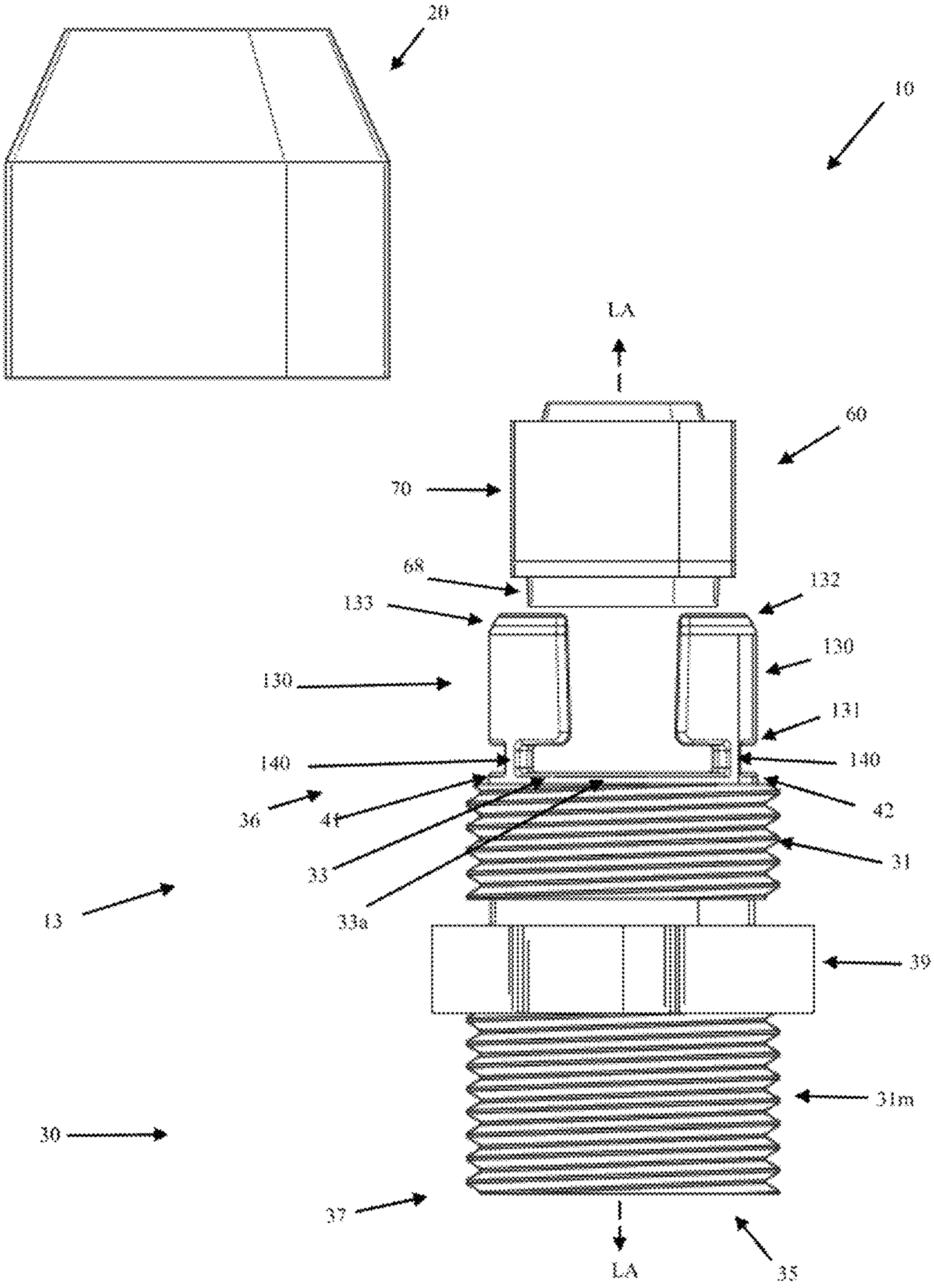
FIG. 2 is a front view of the cable connector shown in FIG. 1.
Figure 3:
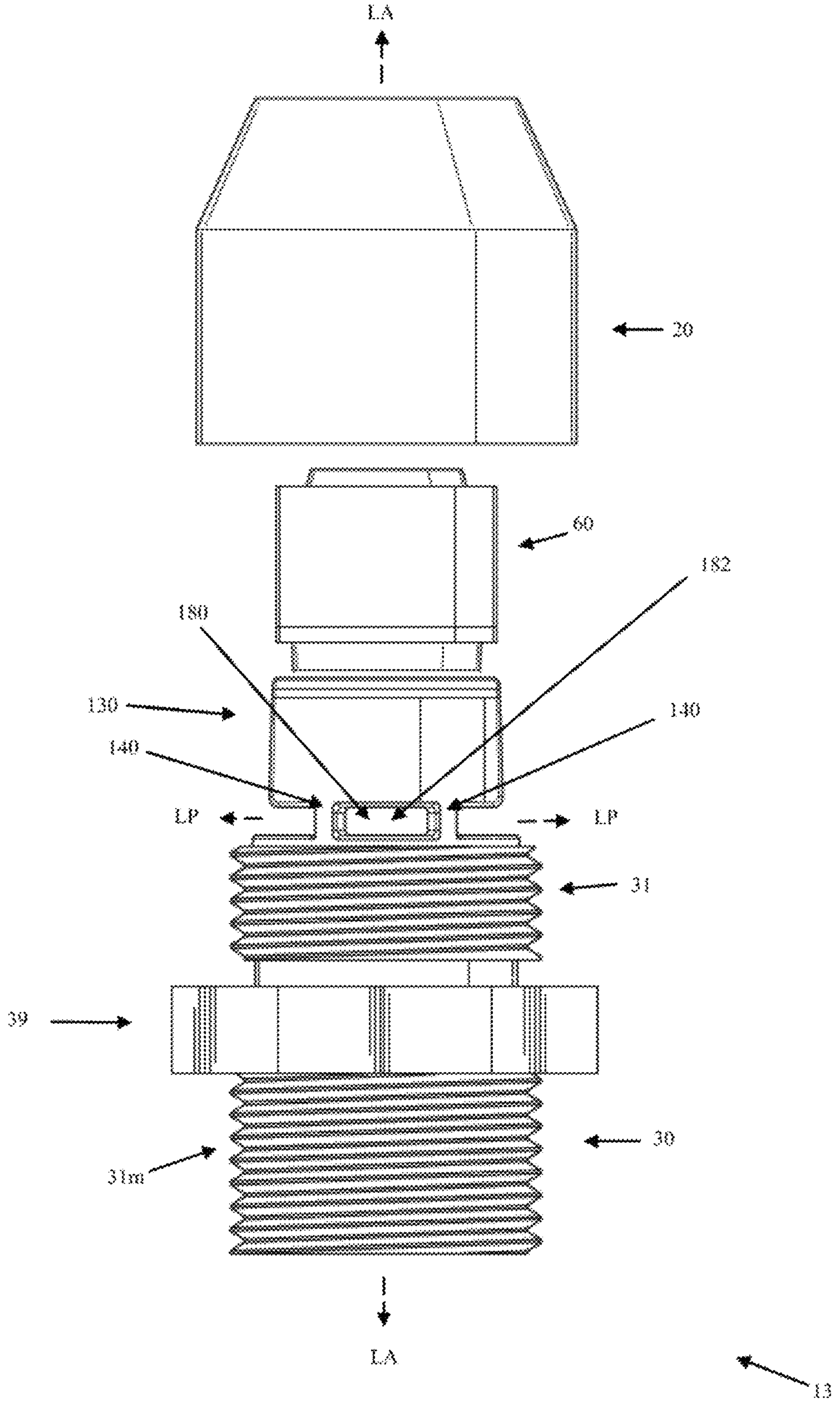
FIG. 3 is a side view of the cable connector shown in FIG. 1.
Figure 4A:
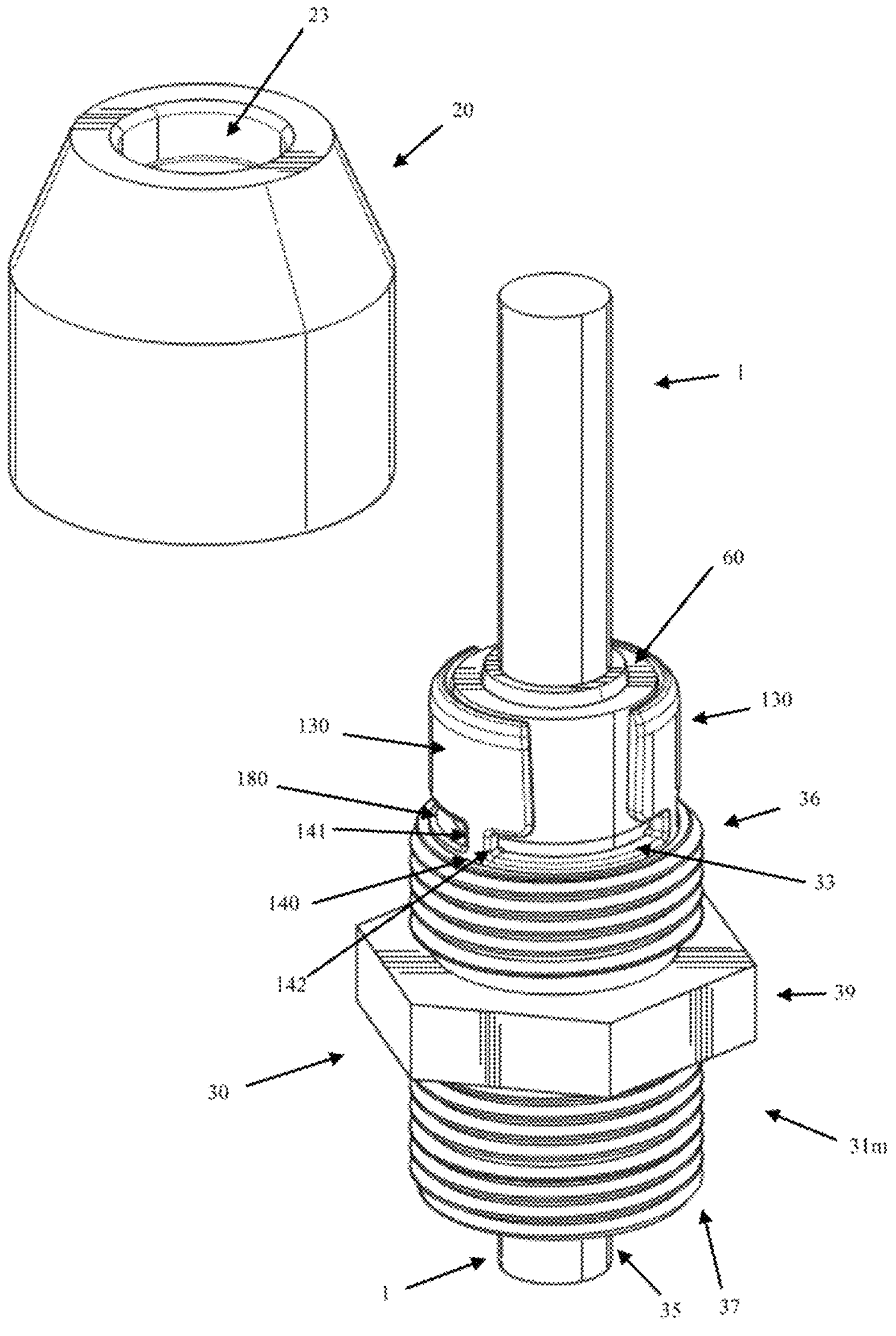
FIG. 4A is a top perspective view of the cable connector shown in FIG. 1 in a partially assembled configuration with a cable inserted into the grommet and the grommet axially coincident with the fingers, according to one embodiment of the invention.
Figure 4B:
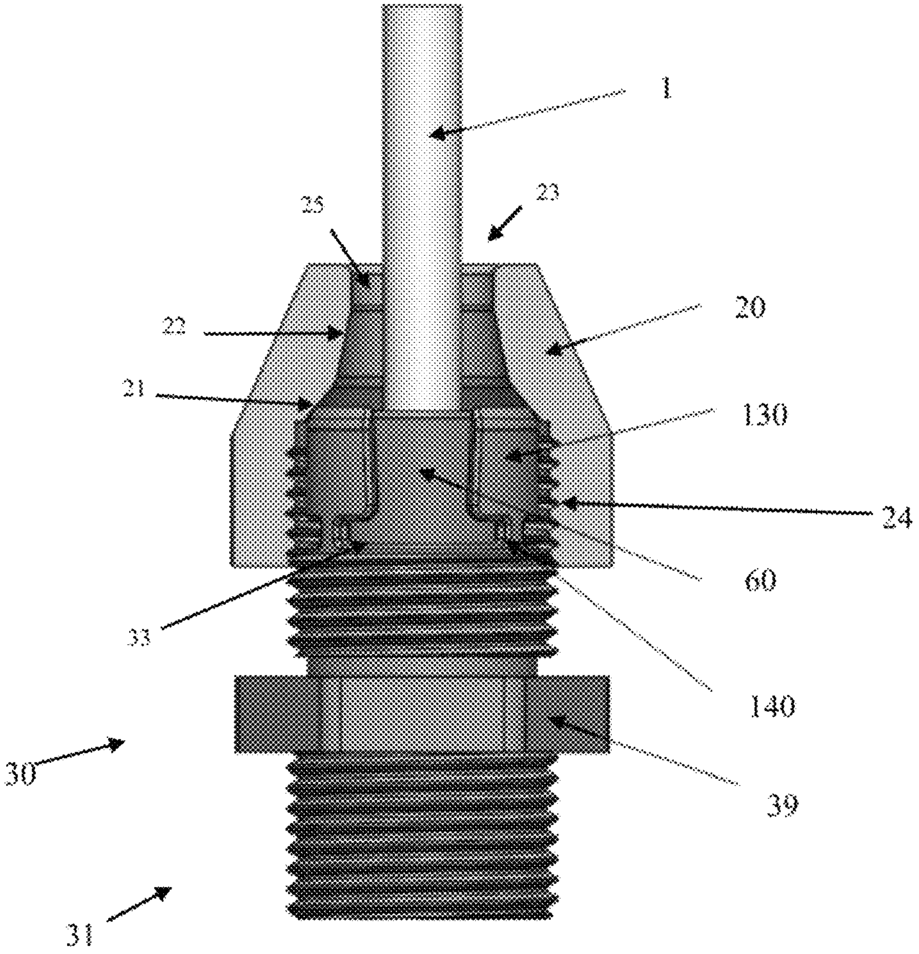
FIG. 4B is a fully assembled view of the cable connector shown in FIG. 4A but with the lock nut shown in half-sectional view for ease of illustration, with the fingers shown in the rest position, the lock nut in the initial position and no deformation of the tabs, according to one embodiment of the present invention.
Figure 4C:
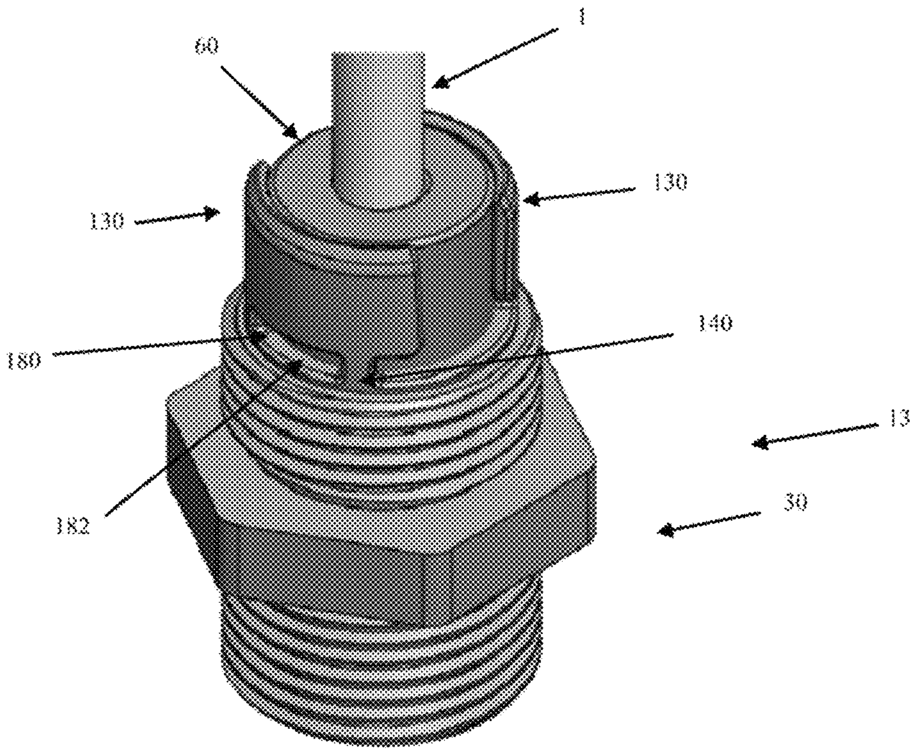
FIG. 4C is a partially assembled view of the cable connector shown in FIG. 4A but with the lock nut not shown for ease of illustration, and the fingers shown in the rest position with no resilient deformation of the tabs, according to one embodiment of the present invention.
Figure 4D:
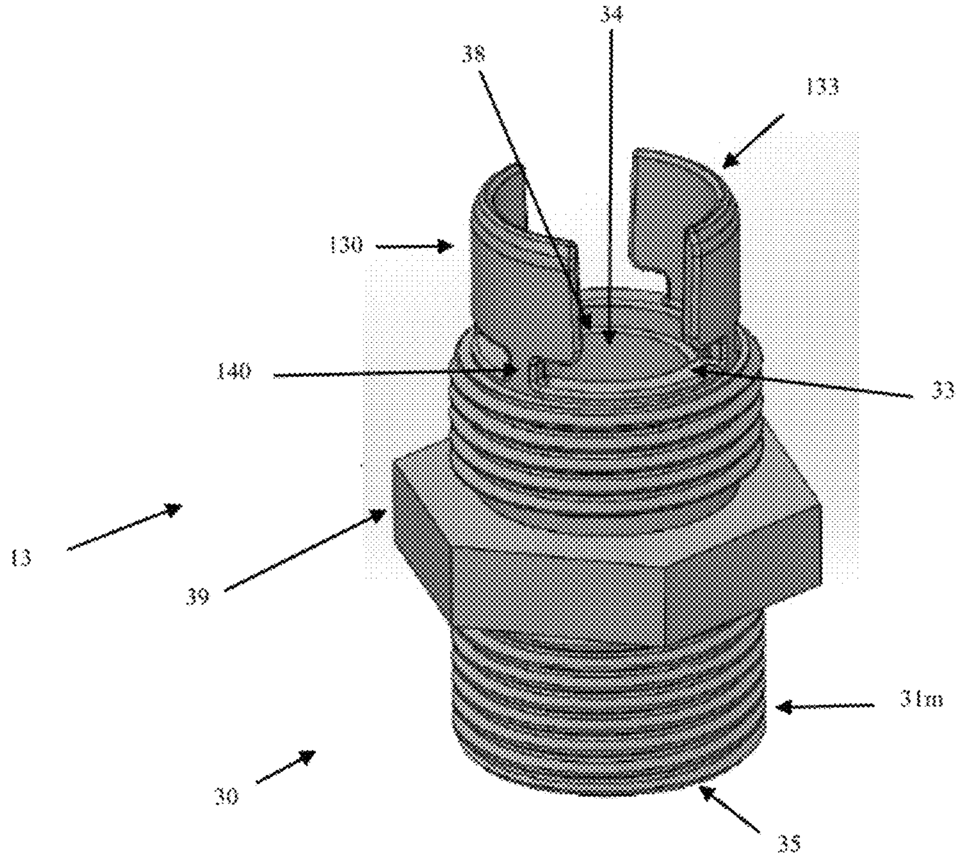
FIG. 4D shows a top perspective view of the connector element of the cable connector in isolation for ease of illustration and the fingers in the rest position, according to one embodiment of the invention.
Figure 4E:
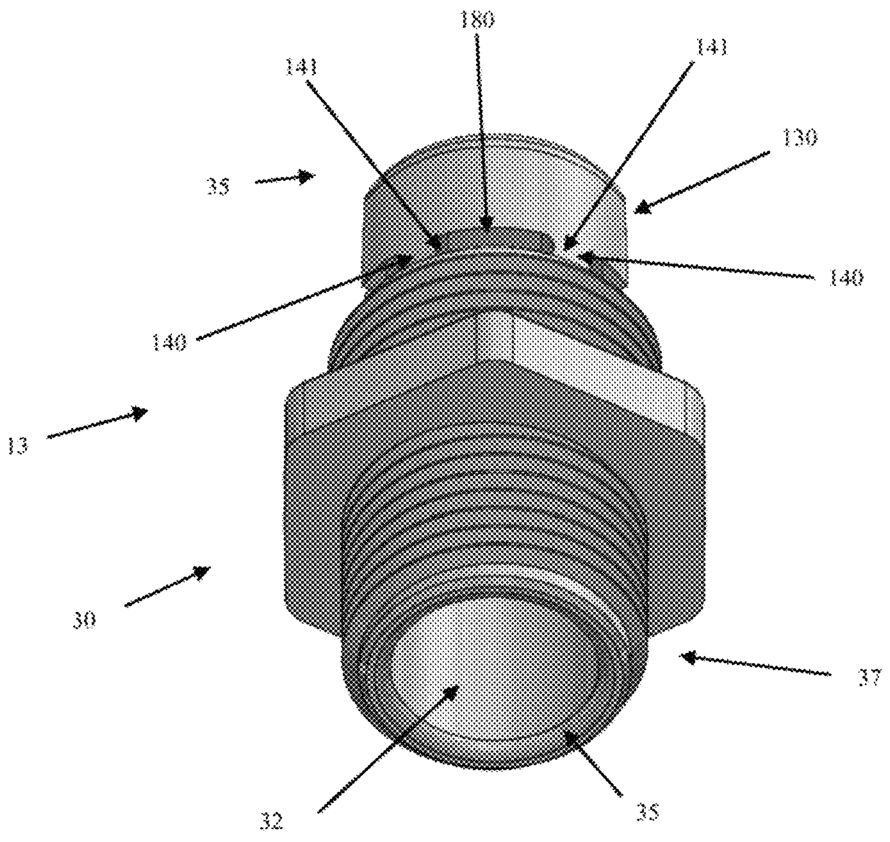
FIG. 4E shows a bottom perspective view of the connector element shown in FIG. 4D.
Figure 5A:
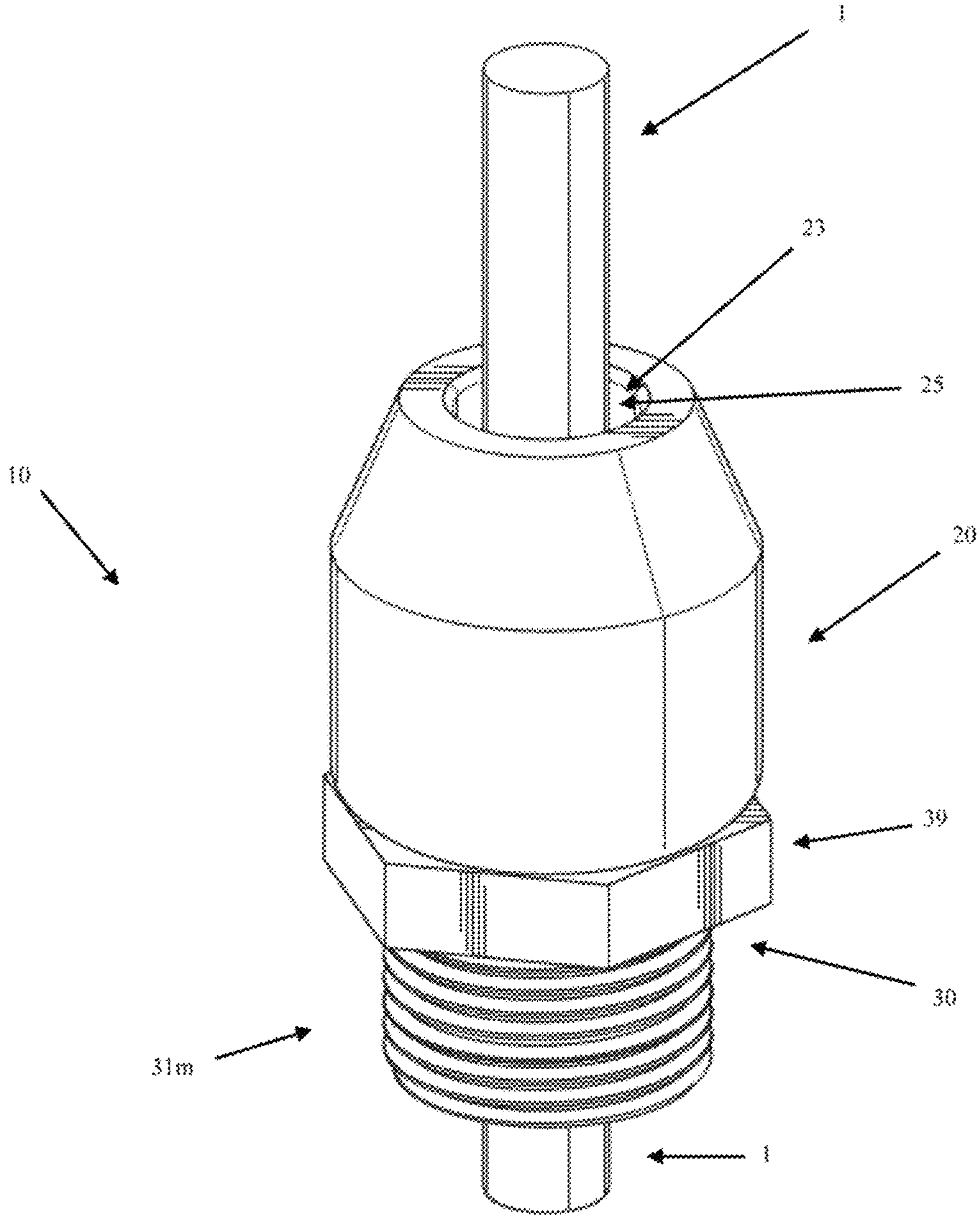
FIG. 5A is a top perspective view of the cable connector shown in FIG. 1 in a fully assembled configuration with the cable inserted in the connector and the lock nut in the tightened position, according to one embodiment of the invention.
Figure 5B:
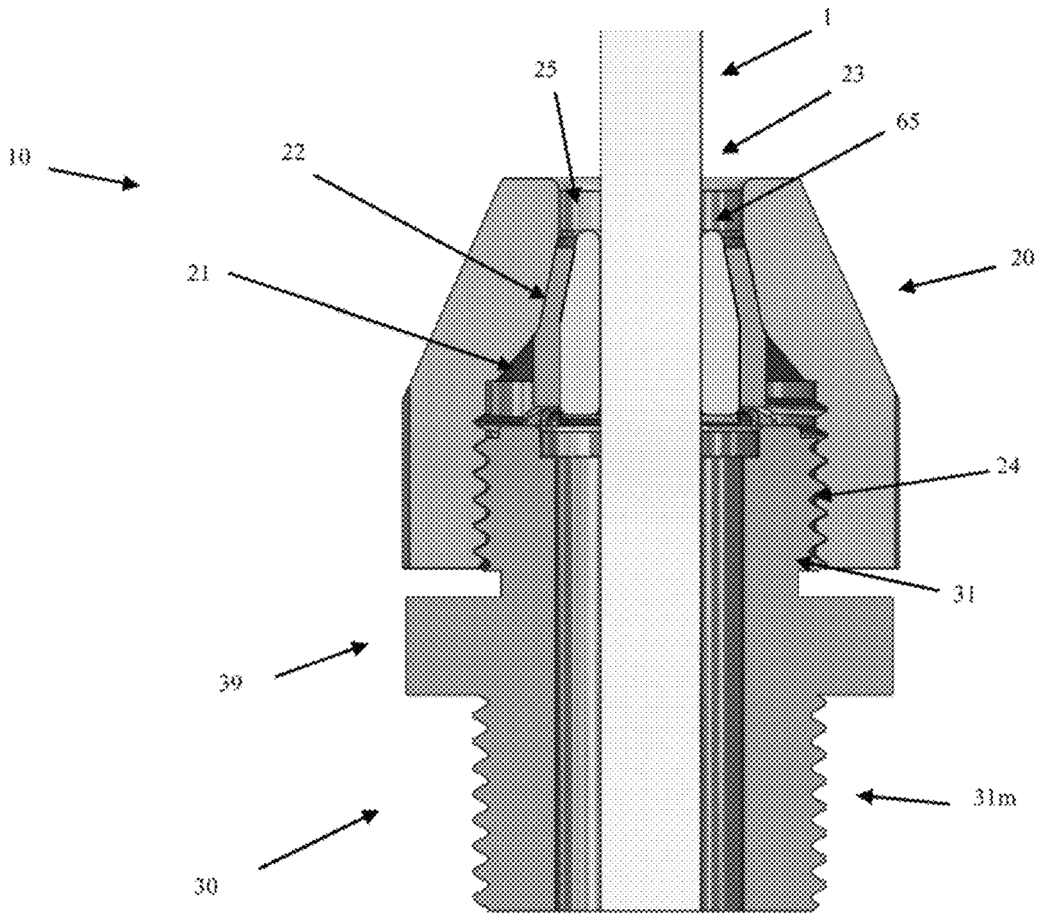
FIG. 5B is a cross-sectional view of the cable connector shown in FIG. 5A with a cable inserted in the grommet and the fingers shown in the contracted position after the lock nut has been axially moved towards the connector body resiliently inwardly deforming the tabs, according to one embodiment of the present invention.
Figure 5C:
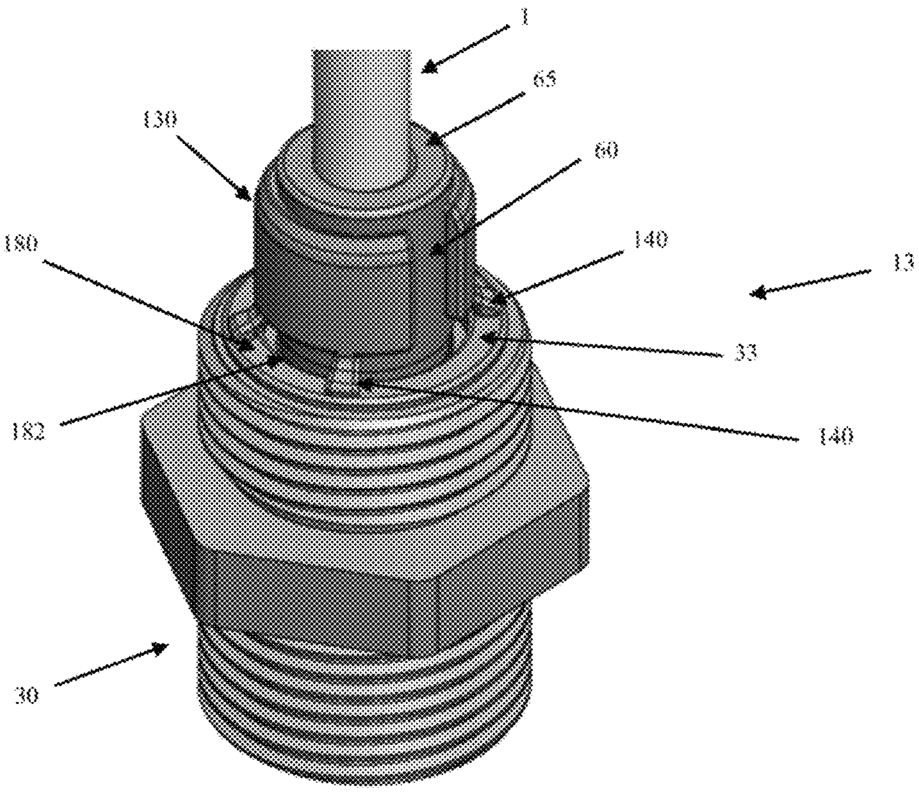
FIG. 5C is a partially assembled view of the cable connector shown in FIG. 5A but with the lock nut not shown for ease of illustration, and the fingers shown in the contracted position after the lock nut has been axially moved towards the connector body resiliently inwardly deforming the tabs, according to one embodiment of the present invention.
Figure 6:
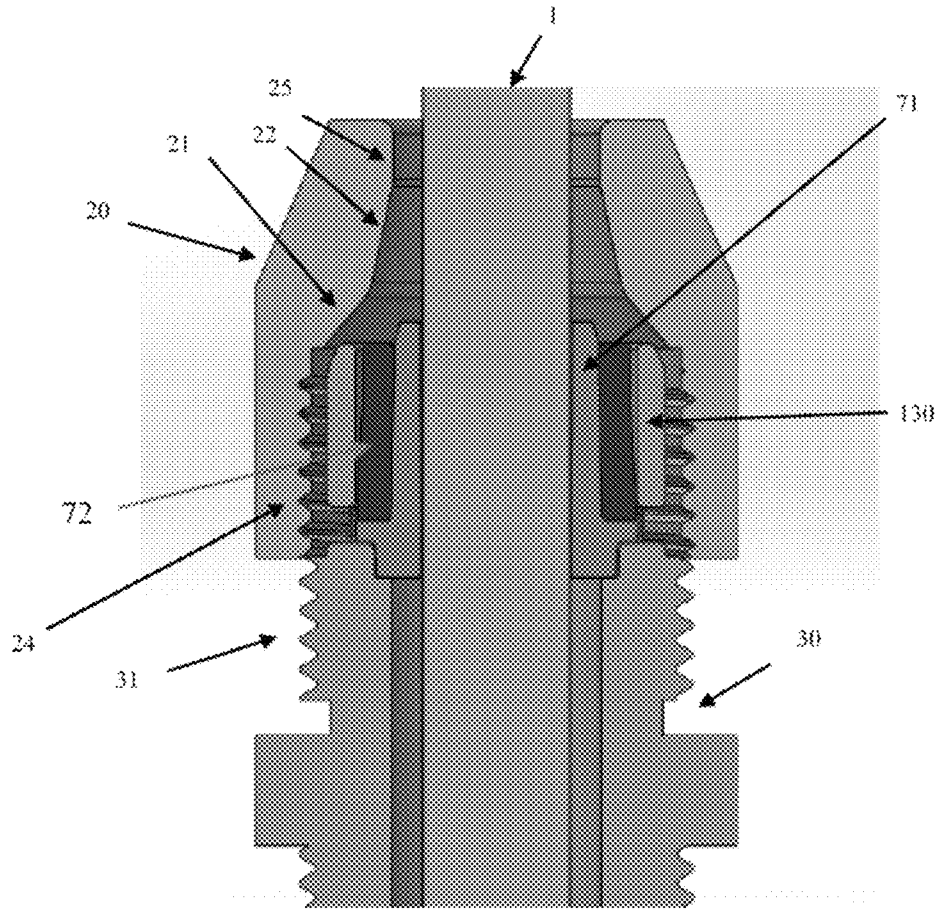
FIG. 6 is a cross-sectional view of a connector in an assembled position with a cable inserted in the grommet and the fingers at the rest position showing the grommet/insert combination according to one embodiment of the invention.

As shown in FIG. 1, one embodiment of the present invention relates to a cable connector or fitting, shown generally by reference numeral 10, in an exploded configuration. As shown in FIG. 1, the connector 10 preferably comprises a lock nut 20 which mates with a connector body 30 and has a grommet 60 located intermediate the lock nut 20 and the connector body 30. FIG. 2 shows a front view and FIG. 3 shows a side view of the cable connector 10 shown in FIG. 1. FIGS. 4A, 4B and 4C show the assembled connector 10 in the initial or rest position with a cable 1 inserted therein but with the lock nut 20 at the initial or non-engaged position before it has been relatively axially moved towards the connector body 30 and the axially extending fingers 130 in the rest position. FIGS. 4D and 4E show the connector element, shown generally by reference numeral 13, in isolation and comprising the connector body 30, the axially extending fingers 130 in the rest position and the radially separated discrete tabs 140 connecting the fingers 130 to the connector body 30. FIGS. 5A, 5B and 5C show the connector 10 with the lock nut 20 axially moved towards the connector body 10 causing radial contraction of the axially extending fingers 130 to the contracted position to compress the grommet 60 with the cable 1 inserted therein to improve the sealing interface, prevent or reduce the likelihood that the cable 1 may be pulled out of the electrical connector 10, and also decreasing the likelihood of the cable chafing or bending.

In one embodiment, as illustrated in FIGS. 1, 2 and 3, the connector body 30 has a connector bore 32 extending therethrough from a receiving opening 34 at the receiving end 36 of the connector body 30 to the exiting opening 35 at the exiting end 37 (see FIGS. 4D and 4E) of the connector body 30. Similarly, the grommet 60 has a grommet bore 62 extending axially through the grommet 60. The grommet bore 62 extends from the grommet cable opening 61 to the grommet exit opening 64 as shown for instance in FIG. 1. During use, the grommet 60 is oriented with respect to the connector body 30 such that the grommet bore 62 communicates with the connector bore 32. In this way, a cable 1 passing through the grommet cable opening 61 will pass through the grommet bore 62, exit through the grommet exit opening 64 and enter the receiving opening 31 of the connector bore 32.

The cable connector 10 preferably also comprises a lock nut 20 which operatively engages the cable connector body 30 and is axially moveable relative to the connector body 30 when operatively engaged therewith. In one embodiment, as illustrated in FIGS. 2 and 3, the connector body 30 may have external threads 31 which may mate with corresponding internal threads 24 (see FIG. 4B) on the lock nut 20 such that relative rotation of the lock nut 20 with respect to the connector body 30 about the longitudinal axis LA (see FIG. 2) causes engagement of the internal threads 24 of the nut 20 and the external threads 31 of the connector body 30 to axially move the lock nut 20 relative to the connector body 30. In this particular embodiment, the connector 10 may be assembled by rotating the nut 20 with respect to the connector body 30, after the cable 1 has passed through the lock nut 20, the grommet 60 and the connector body 30, so that the threads 24, 31 operatively engage to cause relative axial movement of the lock nut 20 towards the connector 30 from an initial position, shown in FIGS. 4A, 4B and 4C, to a tightened position, shown in FIGS. 5A, 5B and 5C.

The cable connector 10, with the cable 1 inserted therein, may be tightened, in one preferred embodiment, by manually rotating the nut 20 with respect to the cable connector body 30. In a preferred embodiment, the connector body 30 may also comprise a tool engagement member, shown generally by reference numeral 39, permitting the use of a tool (not shown), such as a wrench, to further rotate the lock nut 20 with respect to the connector body 30 and further tighten the connector body 30 and the nut 20, if desired. Accordingly, manual rotation may be sufficient to secure the cable 1 within the connector 10 but optionally a tool (not shown) operating on the tool engagement member 39 may also be used. Other manners of axially moving the nut 20 with respect to the connector body 30 are also possible as may be known in the art.

The connector body 30 may also have external mounting threads 31*m* near the exiting end 37. The external mounting threads 31*m* may be used, for example, to mount the connector body 30 (and/or assembled connector 10) to another element, such as an electrical enclosure (not shown), where the connector 10 may be used.

As shown in FIGS. 1, 2, 3, 4D and 4E, the connector 10 comprises at least two, and possibly several, axially extending fingers, shown generally by reference numeral 130. Each of the axially extending fingers 130 extend along the longitudinal axis LA from the connector end 131, which is located proximate or near the connector body 30, to a distal end 132, located distant or remote from the connector body 30. In a preferred embodiment, the connector end 131 of each of the axially extending fingers 130 may be connected to the connector body 30 by at least two (and possibly more) radially separated discrete tabs, shown generally by reference numeral 140. The discrete tabs 140 form an axial space or separation (shown generally by reference numeral 180, in FIGS. 3, 4A and 4C) between the connector body 30 and the connector end 131 of the associated axially extending fingers 130. In this way, translational radial movement of the associated axially extending finger 130 may be permitted by the resilient deformation of the radially separated discrete tabs 140. The radially separated discrete tabs 140 are preferably located at different radial positions about the receiving opening 34 and thus radially separated about the receiving opening 34 of the connector body 30.

As also illustrated, for instance, in at least in FIG. 4A, the discrete tabs 140 may also comprise an inner edge 141 which borders the separation 180 and an outer edge 142 which faces away from the separation 180. In a preferred embodiment, the axially extending fingers 130, the connector body 30 and the radially separated discrete tabs 140 are made by the same material and integrally formed at the same time to form a connector element, shown generally by reference numeral 13 in FIGS. 4D and 4E, but it is understood that other arrangements may be possible, including having different types of material for the discrete tabs 140, axially extending fingers 130 and/or connector body 30, and different manners of assembling them. In one preferred non-limiting embodiment, the connector body 30, discrete tabs 140 and axially extending fingers 130 are integrally formed as a part of the connector element 13.

Relative axial movement of the lock nut 20 towards the connector body 30 from the initial position to the tightened position causes the lock nut 20 to radially contract the axially extending fingers 130 relative to the connector body 30. In this way, the radial contraction of the axially extending fingers 130 relative to the connector body 30 applies compression forces to the grommet 60 located axially coincident with the at least two axially extending fingers 130. These compression forces also act on the grommet bore 62, about the inserted cable 1, to provide a better sealing interface and to prevent or reduce the likelihood that the inserted cable 1 may be pulled out of the cable connector 10. This may also decrease the likelihood of the cable 1 chafing or bending during use.

In a preferred embodiment, the at least two axially extending fingers 130 have a radially inward facing surface 136 (see FIG. 1) which corresponds to the radially outward facing surface 63 of the grommet 60. In this way, when the relative axial movement of the lock nut 20 towards the connector body 30 causes radial contraction of the axially extending fingers 130, the radially inward facing surface 136 of the axially extending fingers 130 operationally engages the radially outward facing surface 63 of the grommet 60 to transfer the compression forces imposed by the lock nut 20 to the grommet 60.

In a further preferred embodiment, the grommet 60 has a substantially tubular radial outer surface 63*t* (as shown in FIG. 1) and the axially extending fingers 130 have a radially inward arc shaped surface 136*a* (as shown in FIG. 1) substantially corresponding to the substantially tubular outer surface 63*t* of the grommet 60. This further facilitates the operational engagement of the axially extending fingers 130 to transfer compression forces to the grommet 60 during contraction of the axially extending fingers 130 by the relative axial movement of the lock nut 20 towards the connector body 30.

In a further preferred embodiment, the at least two axially extending fingers 130 consist of two identical radially arc shaped axially extending fingers 130. This is illustrated in the preferred embodiment shown in FIGS. 1 to 3. The two identical radially arc shaped axially extending fingers 130 are preferably located on opposed ends 41,42 (see FIG. 2) of the receiving opening 34 and symmetrical about an axis LP perpendicular to the longitudinal axis LA of the cable connector 10 (as shown in FIG. 3).

Furthermore, in a preferred embodiment, the at least two axially extending fingers 130 are radially separated from each other and the axially extending fingers 130 need not contact or interact with each other to operate. This allows the fingers 130 to move independently of each other with respect to the connector body 30 so that the radial translational movement of the axially extending fingers 130 is not dependent on one another. Thus, it is less likely that the movement of the fingers 130 would be affected by dirt or other contaminants that could be exposed to the cable connector assembly 10 because each of the fingers 130 may move independently of each other and do not rely on contact or interaction with other fingers 130 to operate. Thus, having axially extending fingers 130 that are adapted to move independently of one another may provide a more robust connector 10. Furthermore, by having at least two radially separated discrete tabs 140 connecting the associated axially extending fingers 130 to the connector body 30, the axially extending fingers 130 can be relatively stable during transportation and prior to use thereby lessening the potential for inadvertent damage to the cable connector 10. Preferably, the discrete tabs 140 are selected so as to be axially long enough to permit the fingers 130 to resiliently move radially towards the grommet 60, but thick enough such that the fingers 130 would not break off during transport or handling. There are also other manufacturing concerns, such as mobility and robustness of the connector element 13 and connector 10 as a whole.

In a further preferred embodiment, the connector body 30 may further comprise a ridge, shown generally by reference numeral 33 (in FIG. 2) extending about the receiving opening 34 of the connector bore 32. In this preferred embodiment, the radially separated discrete tabs 140 may be radially separated along the ridge 33 about the receiving opening 32. In this way, the radially separated discrete tabs 140 connect the associated axially extending fingers 130 to the connector body 30 at distinct separate radial locations. Accordingly, the radially separated discrete tabs 140 are radially separated along the ridge 33 for connecting the associated axially extending finger 130 to the ridge 33 of the connector body 30 at radially separated locations about the receiving opening 34. In a preferred embodiment, the ridge 33 may be an elevated ridge (shown generally by reference numeral 33*a* in FIG. 2) to facilitate connection of the radially separated discrete tabs 140 to the connector body 30.

As illustrated in FIGS. 4A and 4B, when the lock nut 20 is in the initial position and has initially engaged the connector body 30, the axially extending fingers 130 are initially in the rest position, meaning they have not yet been radially contracted by the lock nut 20. In this rest position, little to no compressive force may be applied by the axially extending fingers 130 to the grommet 60, and therefore the grommet bore 62, would permit insertion of the cable 1 therein. It is understood that, even when no compression force is applied to the grommet 60, there may be some restrictive forces encountered when inserting the cable 1 into the grommet bore 62 simply caused by the frictional forces inherent in the interaction of the cable 1 with the grommet bore 60. Nevertheless, at the first rest position, easier insertion of the cable 1 into the grommet bore 62 is permitted than when the axially extending fingers 130 have been radially contracted to provide compressive forces on the grommet 60.

FIGS. 4A, 4B and 4C show the axially extending fingers 130 at this first rest position and the lock nut 20 in the initial position where the lock nut 20 has not yet moved towards the connector body 30 and the lock nut 20 has not contacted the fingers 130 or only initially contacted the fingers 130.

FIGS. 5A, 5B and 5C illustrate the lock nut having been axially moved towards the connector body 30 to the tightened position, such as by rotating the nut 20 with respect to the connector body 30 about the longitudinal axis LA to permit operational engagement of the external threads 31 of the connector body 30 and the internal threads 24 of the nut 20 as discussed above according to one non-limiting embodiment. FIGS. 5B and 5C in particular illustrate the axially extending fingers 130 in the second contracted position, where the axially extending fingers 130 have translationally radially contracted towards the grommet 60 to compress the grommet 60 about the cable 1 inserted in the connector 10. In this second contracted position of the fingers 130, compression forces have been applied to the grommet 60 by the nut 20 radially contracting the axially extending fingers 130 toward the grommet 60, and in particular the grommet bore 62 and the cable 1 inserted into the grommet bore 62, which may increase the frictional forces, and improve the sealing interface between the grommet 60 and the inserted cable 1, with a view to reducing the likelihood that the cable 1 may be pulled out of the cable connector 1 or otherwise bent.

Comparing the position of the axially extending fingers 130 at the rest position, shown for example in FIG. 4B, and the position of the axially extending fingers 130 at the second contracted position, shown for example in FIGS. 5B and 5C, it is seen that the axially extending fingers 130 have not necessarily pivoted radially inwardly but, rather, have experienced radial translational movement, with a possibility for some rotational or pivoting motion. In some preferred embodiments, this has been found to improve the distribution of the compression forces axially along the grommet 60 and, in particular, the grommet bore 62, which may improve the friction fit and sealing interface between the grommet 60 and the inserted cable 1. It is also apparent from FIGS. 4B and 5B that both the distal end 132 and connector 130 of the fingers have experienced some degree of radially contraction toward the grommet 60.

Furthermore, as illustrated for instance in FIG. 4B, in one preferred embodiment, at the rest position, the radial arc shaped axially extending fingers 130, according to one preferred embodiment, are radially aligned with the ridge 33, and, the connector end 131 of each of the axially extending fingers 130 are substantially opposed from the ridge 33 with the axial separation 180 between the connector body 30 and the connector end 131 of the associated axially extending fingers 130 defining a curved rectangular opening (shown generally by reference numeral 182 in FIGS. 4C and 5C) bordered by the ridge 33 associated with the connector body 30, the inner edges 141 of the connecting tabs 140 and the connector end 131 of the associated axially extending fingers 130.

In comparison, FIG. 5B illustrates the lock nut having been axially moved towards the connector body 30 which has caused the discrete radially separated tabs 140 to resiliently radially inwardly deform permitting radial contraction of the associated axially extending fingers 130 thus moving the axially extending fingers 130 from the first rest position to the second contracted position. In the second contracted position, as shown in FIG. 5B, the connector end 131 of the associated axially extending fingers 130 have radially contracted towards the grommet 60 and the axial separation 180 has become an axial and radial separation 180 between the connector body 30 and the connector end 131 of the associated axially extending fingers 130 caused by the radial contraction of the axial extending fingers 130. Similarly, the distal ends 132 of the fingers 130 have also radially contracted towards the grommet 60, although potentially to a different degree than the connector end 132 and possibly with some axial and/or pivoting movement. In this position, radial compressive forces may be applied by the lock nut 20 acting through the axially extending fingers 130 to the grommet 60 along an axial distance corresponding to the axial contact surface of the lock nut 20 acting on the axially extending fingers 130. This is facilitated by both the distal end 132 and connector end 131 of the fingers 130 radially contracting about the grommet 60. In a preferred embodiment, as illustrated in FIGS. 4B and 5B, the substantially tubular radially outward surface 63*t* of the grommet 60 operationally engages with the radially inward arc surface 136*a* of the axially extending fingers 130 to ensure operational engagement and therefore application of compressive forces acting along a substantial portion of the axially extending fingers 130.

It is understood that in the tightened position, the lock nut 20 has been axially moved towards the connector body 30 to ensure that the desired frictional fit and sealing interface between the grommet 60 and inserted cable 1 has been achieved. The tightened position of the lock nut 20, and the corresponding second contracted position of the axially extending fingers 130, therefore need not be a specific position but, rather, could be judged by the user of the cable connector 10. In one non-limiting embodiment, the interaction of the external threads 31 of the connector body 30 and the internal threads 24 of the lock nut 20 may reach a maximum point of rotation and thereby prevent further relative axial movement of the lock nut 20 towards the connector body 30 so as to avoid over tightening of the connector 10, and corresponding over compression of the grommet 60. Nevertheless, it is understood that, while the first rest position of the axially extending fingers 130, and the initial position of the lock nut 20, may be where no or little compressive force is applied by the lock nut 20, the second contracted position of the fingers 130, and tightened position of the lock nut 20, is not necessarily a finite position, but rather may be the position the user has selected as providing the required radial compression forces, and corresponding sealing interface, which may be, but is not necessarily, coincident with a maximum relative rotation of the lock nut 20 with respect to the connector body 30 permitted by the particular cable connector 1.

FIG. 5C shows the partially assembled view of the cable connector 1 shown in FIG. 5A but with the lock nut 20 not shown for ease of illustration. In this FIG. 5C, it is more clearly seen how the axially extending fingers 130 are in the second radially contracted position and the tabs 140 have been resiliently deformed according to one preferred embodiment of the invention. As also illustrated in FIGS. 5B and 5C, as compared to FIGS. 4B and 4C, the grommet 60 has also become compressed and, given that the grommet 60 may comprise flexible material, some excess material (shown by reference numeral 65 in FIGS. 5B and 5C) of the grommet 60 may have been displaced axially beyond the distal end 132 of the axially extending fingers 130 as compared to FIGS. 4B and 4C, where there is no excess material 65 of the grommet 60 located axially beyond the distal end 132 of the axially extending fingers 130. This is an example of the radial compressive forces applied by the axially extending fingers 130 when they are radially contracted from the first rest position to the second contracted position compressing the grommet 60 and resiliently displacing excess material 65. FIGS. 5A and 5B also illustrate how the lock nut 20 has an axial tubular portion 25 at the cable opening 23. In this way, any excess material 65 (see FIGS. 5B and 5C) from the grommet 60 which has been resiliently displaced beyond the distal end 132 of the axially extending fingers 130 may be contained in this tubular portion 25 of the lock nut 20 rather than extend beyond the lock nut 20 and be seen by the user and/or possibly damaged or interfered with during use.

The lock nut 20 also comprises a first inner finger engagement surface 21 and a second inner finger compression surface 22, axially separated from the first finger engagement surface 21. The first inner engagement surface 21 is sized and shaped to independently initially engage each of the axially extending fingers 130. In a preferred embodiment, the axially extending fingers 130 have a nut engagement surface 133 at the distal end 132, as shown for instance in FIG. 2, which is preferably slanted to initiate engagement with the first inner finger engagement surface 21 of the lock nut 20. Also, the first inner finger engagement surface 21 is located axially remote from the cable opening 23 of the lock nut 20. Rather, the first inner finger engagement surface 21 is preferably located near the internal threads 24 of the lock nut. In a further preferred embodiment, the first inner engagement surface 21 is frusto-conically shaped as shown for example in FIG. 4B.

The second finger compression surface 22 is sized and shaped to contract the axially extending fingers about the grommet 60 and to compress the grommet 60. In a preferred embodiment, as shown for instance in FIG. 5B, the second finger compression surface 22 is sized and shaped to compress the axially extended fingers 130 for an axial distance consisting of about 50% of the axial distance from the distal end 132 to the connector end 131 of the fingers 130. In this way, axial compression forces are directly applied by the second finger compression surface 22 along at least about 50% of the axial distance of the axial finger 130 (from the distal end 132 towards the connector end 131) and at least about 50% of the grommet 60 as well as the grommet bore 62 with the inserted cable 1 therein. This is facilitated, in part, by the axial separation 180 becoming an axial and radial separation 180 as shown in FIG. 5B caused by the radial contraction of the distal end 132 and connector end 131 of each of the fingers 130. In a preferred embodiment, the second finger compression surface 22 is also frusto-conically shaped as shown for example in FIG. 4B, and may act as an axial contact surface of the lock nut 20 to apply radial compressive forces through the axially extending fingers 130 to the grommet 60.

As shown in FIGS. 4B and 5B, the lock nut 20 is arranged such that the threads 24 are axially near the first finger engagement surface 21. In this way, as the internal threads 24 commence operational engagement of the external threads 31 on the connector body 30, the first finger engagement surface 21 initially and independently engages the nut engagement surface 133 of each of the axially extending fingers 130. The first inner engagement surface 21 is axially separated from the second inner finger compression surface 22 and in a preferred embodiment is axially adjacent the first inner finger engagement surface 21. The axially tubular portion 25 is then preferably axially adjacent the second finger engagement surface 22. In a preferred non-limiting embodiment, the axial tubular portion 25 is near and/or forms the cable opening 23 for receiving the cable 1 into the lock nut 20. As indicated above, the axially tubular portion 25 may be sized and shaped to receive any excess material 65 from the compressed grommet 60.

In a further preferred embodiment, as illustrated in FIGS. 1 and 2, the grommet 60 has a body engagement surface 68 for engaging the connector body 30 at a position axially coincident with the axially extended fingers 130 and with the grommet bore 62 aligned with the receiving opening 34 of the connector bore 32 for passing the cable 1 therethrough. Furthermore, the connector body 30 comprises a grommet seat, shown generally as reference numeral 38 in FIG. 1, associated with the receiving opening 34 for receiving and orienting the grommet 60 at the position axially coincident with the axially extending fingers 130 and with the receiving opening 34 of the connector bore 32 aligned with the exit opening 64 of the grommet bore 62. This facilitates orientation and positioning of the grommet 60 at a position axially coincident with the fingers 130 and the grommet bore 62 aligned with the connector bore 32. Accordingly, when the grommet 60 is axially coincident with the axially extending fingers 130, the grommet bore 62 is oriented with respect to the connector bore 32 to permit a cable 1 entering through the grommet cable opening 61 to pass through the grommet bore 62 and exit through the grommet exit opening 64 and then enter the receiving opening 34 of the connector bore 32.

In one preferred embodiment, the grommet 60 comprises a first flexible portion 71 extending about the grommet bore 62 for engaging the inserted cable 1. In this way, the first flexible portion 71 of the grommet 60 about the grommet bore 62 creates a sealing interface with the inserted cable 1. There may also be a friction fit between the first flexible portion 71 in the grommet bore 62 and the inserted cable 1 requiring some force to permit insertion of the cable 1 into the grommet bore 62. However, as indicated above, this required force to permit insertion of the inserted cable 1 into the grommet bore 62 would be less than the force required to insert or pull out the cable after the axially extending fingers 130 have moved to the second contracted position and applied a compression force to the grommet 60. In a preferred embodiment, the first flexible portion 71 is a rubber or other rubber-like material, such as a polymer, as is known in the art for creating a sealing interface.

FIGS. 1, 2 and 3 show a grommet 60 having only the first flexible portion 71 forming the entire grommet 60 including the bore 62. Alternate embodiments are also possible and may facilitate cables having different shapes and sizes. For instance, in addition to the grommet 60 shown in FIGS. 1, 2 and 3 having a grommet bore 62 for accommodating the inserted cable 1 having a first size and shape, the cable connector 10, may also comprise a further second grommet 60*s*, as shown for example in FIGS. 7 to 10B, having a second grommet bore 62*s*, different than the grommet bore 62. The second grommet bore 62*s* may be sized and shaped to accommodate a second inserted cable 2 having a second size and shape different from the size and shape of the inserted cable 1. In this way, the same cable connector 10 may have grommets 60, 60*s*, with different grommet bores 62, 62*s*, to accommodate cables 1, 2 having different sizes and shapes.

In other respects, the second grommet 60*s* will operate in a similar manner to the grommet 60 as discussed above. In particular, the external features, such as the radially outward surface 63, and preferably the substantially tubular radially outward surface 63*t*, will likely be similar between the grommet 60 and second grommet 60*s*, to permit interchangeability of the grommets 60, 60*s* in the same connector 10. In particular, the radially inward facing surface 163 of the fingers 130 would operatively engage the radially outward surface 63, 63*s* of either the grommet 60 or further second grommet 60*s* so as to compress the grommets 60 or 60*s*. Furthermore, multiple types of grommets 60, 60*s* may be sold with a single nut 20 and connector element 13, and optionally other components, such that the most appropriate grommet 60, 60*s* could be selected from the kit for use with the corresponding cable 1, 2, depending on which bore 60, 62*s* best corresponds to the external cross section of the cable 1, 2. Alternatively, a single grommet 60 or 60*s* may be sold with a single nut 20 and connector element 13, for instance the connector 10 is designed to be used with a specific cable 1, 2.

Figure 7:
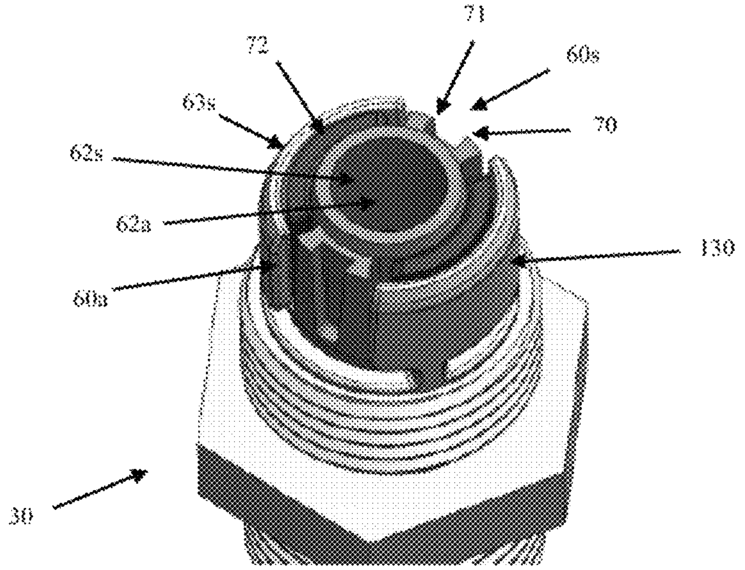
FIG. 7 is a top perspective view of the connector element and grommet/insert combination to accommodate cables of a relatively smaller diameter according to one embodiment of the present invention.

By way of non-limiting example, FIG. 7 shows a second grommet 60*s*, identified more specifically by reference numeral 60*a*, for accommodating a cable 2 having a smaller diameter than the diameter of cable 1 shown in FIG. 1. In this way, the bore 62*a* of the smaller diameter grommet 60*a* will have a smaller diameter and bore 62. Also, the smaller diameter grommet 60*a* may optionally have protrusions 74 to assist with compression of the grommet 60*a* and also the flow of excess material 65. In this embodiment, the protrusion 74 may extend axially between the fingers 130, which may facilitate orientation of the grommet 60*a* between the fingers 130, and may also have a removed wedge section 73 to accommodate compression of the smaller grommet 60*a*.

Figure 8A:
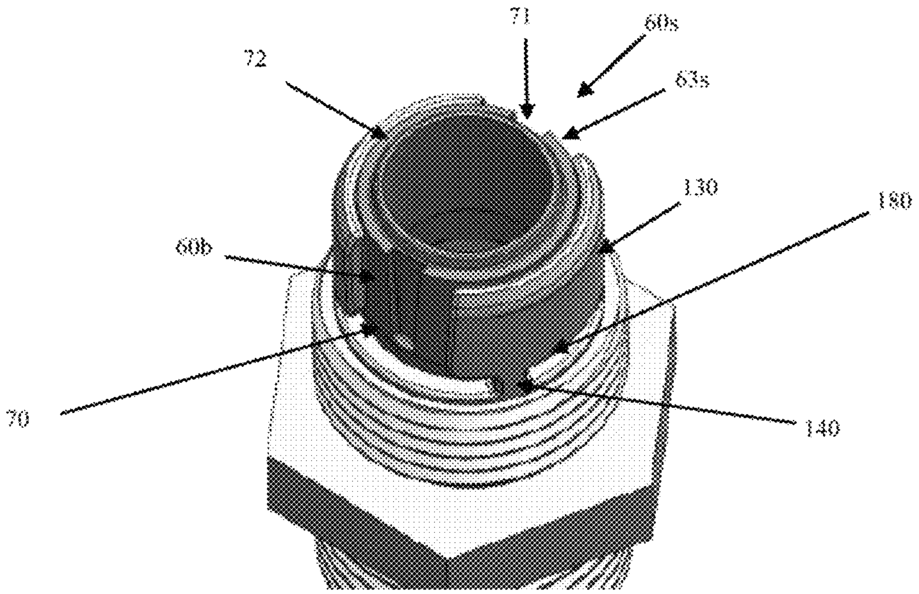
FIG. 8A is a top perspective view of the connector element and grommet/insert combination to accommodate cables of a relatively larger diameter according to one preferred embodiment of the present invention, and, FIG. 8B shows the connector of FIG. 8A with a larger diameter cable inserted therein.
Figure 8B:
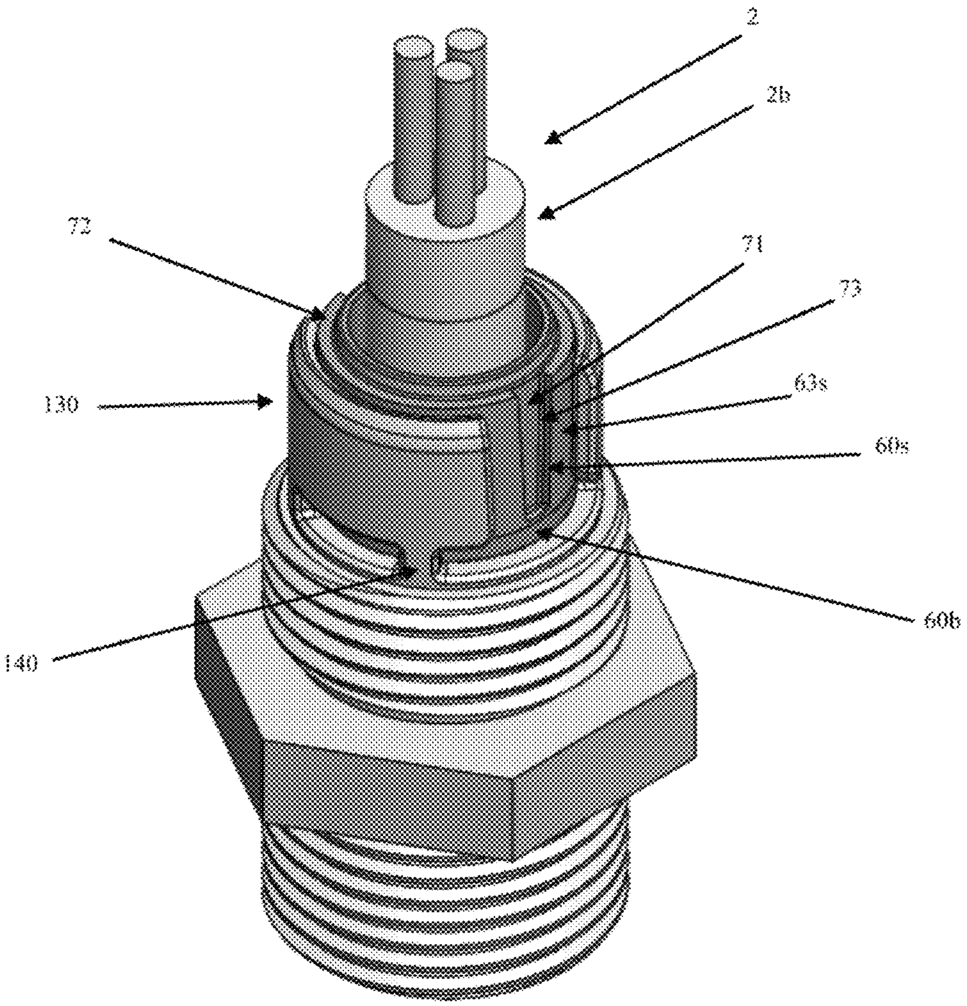

FIG. 8A shows a second grommet 60*s*, more particularly shown by reference numeral 60*b*, for accommodating cables having a larger diameter than the cable 1 shown in FIGS. 1-3. The larger diameter grommet 60*b* may also have a removed wedge section 73 to accommodate compression of the larger diameter grommet 60*b*. The removed wedge section 73 may also be located axially between the fingers 130. FIG. 8B shows the second cable 2, having the larger diameter than inserted cable 1 (and further identified by reference numeral 2*b*), being inserted in the larger diameter grommet 60*b*. It is understood that the larger diameter grommet 60*b* and/or the smaller diameter grommet 60*a* may be the second grommet 60*s* in a kit comprising the grommet 60 and/or one or more of grommets 60, 60*a* and 60*b* may all be sold together to interchangeably fit between the fingers 130 in order to accommodate cables 1, 2 having different sizes and shapes.

Figure 9:
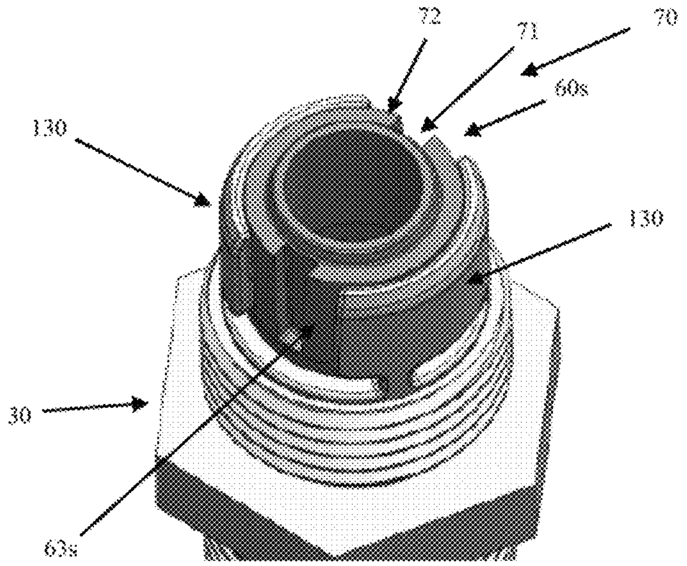
FIG. 9 is a top perspective view of the connector element and grommet/insert combination to accommodate cables of different diameter according to one preferred embodiment of the present invention.

FIG. 9 is a further non-limiting embodiment showing a further second grommet 60*s*, identified by reference numeral 60*c*, which can accommodate a cable (not shown in FIG. 9) of the still further size and/or shape than cable 1. The grommet 60*c* may also have a removed wedge section 73 to accommodate compression of the grommet 60*c*. In the embodiment shown in FIG. 9, the removed wedge section 73 is in the rigid portion 72 rather than the flexible portion 71 (as compared to the smaller diameter grommet 60*a* shown in FIG. 7).

Figure 10A:
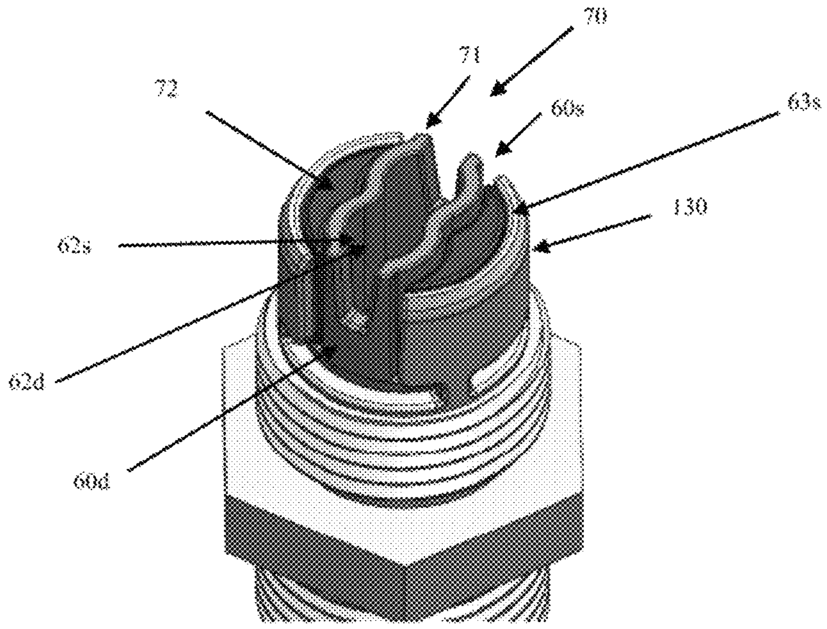
FIG. 10A is a top perspective view of the connector element and grommet/insert combination to accommodate cables of non-circular cross-section according to one embodiment of the present invention, and, FIG. 10B shows the connector of FIG. 10A with a non-circular cross-section cable inserted therein.
Figure 10B:
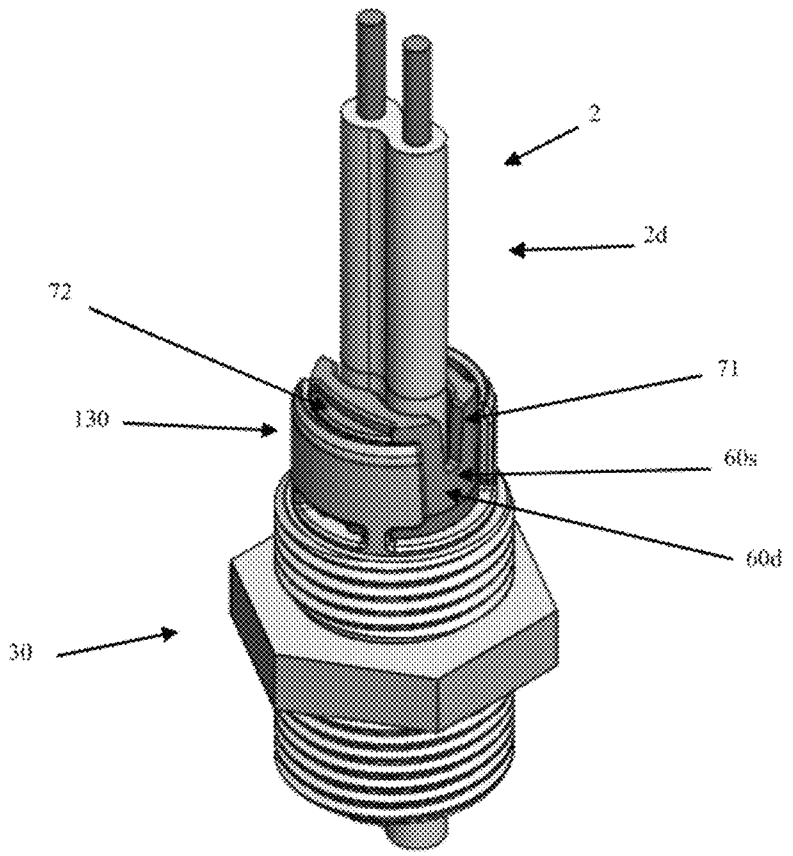

FIG. 10A illustrates a still further second grommet 60*s*, shown more specifically by reference numeral 60*d*, to accommodate a second cable 2, identified more specifically by reference numeral 2*d* in FIG. 10B, having a non-circular cross-section. As shown in FIGS. 10A and 10B, the cable 2*c* may be able to accommodate two axially separated channels or wires so as to create a double cable cross-section, but cable 2 may have other types of non-circular cross-sections are also possible. The non-circular cross-section grommet 60*d* may also have a non-circular cross-section grommet bore 62*d* to accommodate non-circular cross-section cables, such as cable 2*c* shown in FIG. 10B. Optionally, non-circular cross-section grommet 60*d* may also have a removed wedge section 73, in this case in the flexible portion 71, again to accommodate compression of the grommet 60*s* about the non-circular cable 2*d*, as shown for instance in FIGS. 10A and 10B.

In a further preferred non-limiting embodiment, as also discussed above, the grommet 60, 60*s*, may comprise the first flexible portion 71 having a first hardness and a second portion 72, radially remote from the grommet bore 62, having a second hardness, different from the first hardness. The first hardness of the first flexible portion 71 may be selected for engaging the inserted cable 1 and the second hardness of the second rigid portion 72 may be selected for engaging the axially extending fingers 130. In this preferred embodiment, the second hardness would be greater than the first hardness. In this way, the material and hardness of the first flexible portion 71 may be selected to be a softer or resilient material, such as rubber or rubber-like material, to create a seal about the inserted cable 1. However, the material and hardness of the second rigid portion 72, having a second hardness may be selected to be harder or less resilient to better operatively engage the axially extending fingers 130, particularly when the axially extending fingers 130 move from the first rest position to the second contracted position. In one preferred embodiment, the second rigid portion 72 which engages the axially extending fingers 130, may more easily transfer the compressive forces resulting from contraction of the axially extending fingers 130 from the first rest position to the second contracted position. For example, the second rigid portion 72 may better bridge the radial distance between the fingers 130 and the first flexible portion 71, for instance when the cable 1 has a smaller diameter, (see for example grommet 60*a* shown in FIG. 7 which is designed for a cable having a smaller diameter) so as to avoid using a large amount of flexible material which may flow and resiliently deform during compression of the grommet 60.

Comparing FIGS. 7 to 10B, it is apparent that the rigid material 72 is used to accommodate cables 2 of different sizes and shapes and to transfer the compressive forces to the flexible portion 71. For example, FIG. 7 has a radially thicker rigid portion 72 as compared to the rigid portion 72 of FIG. 8 so that the grommet/insert combination 70 in FIG. 7 may accommodate a cable 2 of smaller diameter than shown in FIG. 8. Similarly, the flexible portion 71 and rigid portion 72 shown in FIGS. 10A, 10B may be non-circular in cross-section so that the grommet/insert combination 70 of FIGS. 10A, 10B may accommodate a cable 2*d* that is non-circular in cross-section.

As illustrated in FIGS. 4, 6 and 7 and 10B, the connector 10 may consist of the grommets 60 with the bore 62 and/or the further second grommet 60*s* with the second grommet bore 62*s*. In other words, the connector 10 may consist of any one of the grommet 60 or second grommet 60*s*, or, there may be more than one type of grommet 60 and second grommet 60*s* with different sized and shaped second grommet bore 62*s* to accommodate different types of inserted cables 2 that may be used or sold together or as a kit. For example, a kit may consist of the lock nut 20, and connector element 13 with one or more of the grommet 60, the smaller grommet 60*a*, the larger grommet 60*b*, the grommet 60*c*, the non-circular cross-section grommet 60*d*, or variations thereof, to permit interchangeability of the grommet 60 and second grommet 60*s* to permit the connector 10 to accommodate cables 1, 2 having different sizes and shapes. In this way, a lock nut 20 and connector element 13 may have multiple different grommets 60, 60*s* with grommet bores 62, 62*s* having different sizes and shapes to accommodate different types of cables 1 and second cables 2 to improve versatility of the overall cable connector 10. These may be provided, for example, in a kit form with an individual lock nut 20 and connector element 13 and several different grommets 60, 60*s* to accommodate differently shaped and sized cables 1, 2. It is also understood that references to smaller grommet 60*a* and larger grommet 60*b* are relative terms depending on the specific use or application of the connector 10 and may in any case accommodate cables 1, 2 having a range of diameters. For example, the smaller grommet 60*a* may accommodate varying cable diameters of 0.335" to 0.395", but it is understood that other ranges are possible.

In a further preferred embodiment, the grommet 60 may comprise a grommet/insert combination (shown generally by reference numeral 70 in FIGS. 7, 8A, 9 and 10A). The grommet/insert combination 70 may have a first flexible portion 71 which has a first hardness and forms the grommet bore 62 to engage the inserted cable 1. The grommet/insert combination 70 may also comprise a second rigid portion 72, having a second hardness and forming the substantially tubular outer surface 63*t* for engaging the axially extending fingers 130 having a radially inward arc shaped surface 136. In this way, the compressive forces can be more easily transferred from the axially extending fingers 130 to the first flexible portion 71 about the cable 1 by means of the axially extending fingers 130 operatively engaging the second rigid portion 72 of the grommet/insert combination 70 forming the substantially tubular outer surface 63*t*. In a preferred embodiment, the substantially tubular outer surface 63*t* of each of the grommets 60 and second grommet 60*s*, would be substantially the same to permit interchangeability of the grommet 60, 60*s* between the same axially extending fingers 130 of the connector element 13.

In one preferred embodiment, the second rigid portion 72 is integrally formed with the first flexible portion 71 to create a single integral grommet/insert combination 70. This may be accomplished, in a preferred embodiment, by a two-shot molding procedure, as is known in the art, performing injection molding in two (or more) consecutive cycles. In this way, the rigid portion 72 and flexible portion 71 may be molded together to form an integral grommet/insert combination 70 having the first flexible portion 71 with a first hardness for engaging the inserted cable 1, and, the second rigid portion 72 having a second hardness different from the first hardness for engaging the axially extending fingers 130. By having a grommet 60 that is an integral grommet/insert combination 70, it is easier to transport and handle the first and second portions 71,72 (because they comprise a single integral grommet/insert combination 70), and, the benefit of the first flexible portion 71 and second rigid portion 72 of the different integral grommet/insert combinations 70 may be efficiently obtained, particularly if there are several grommets 60, 60*s* to accommodate cables of different shapes and sizes. It is understood that other means and manners to integrally form a grommet/insert combination 70 with a first flexible portion 71 and a second rigid portion 72 are also possible. As also shown in FIGS. 7 to 10B, the flexible portion 71 and/or rigid portion 72 may have a removed wedge section 73 to facilitate compression of the grommet 60*s*. In one non-limiting embodiment, the removed wedge section 73 represents a portion of material being removed to provide space for the rigid material 72 to move radially inward. Furthermore, the flexible portion 71 may have a protrusion 74, again to accommodate compression of the grommet 60*s*, particularly if cables 1, 2 of relatively smaller diameter are used.

It is understood that no element, act or implementation described in this description should be construed as essential to the invention or critical to the implementation, unless explicitly described as such. Also, where only one item is intended, the term "one" or similar language is used, but it is understood that the article "a" is intended to include one or more items. Furthermore, the word, "comprising" is intended to mean including, unless explicitly stated otherwise.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A cable connector for receiving a cable, said cable connector comprising:

a connector body having a connector bore extending therethrough from a receiving opening to an exiting opening;

a lock nut for engaging the connector body and axially moveable relative to the connector body when engaged therewith;

at least two axially extending fingers, each of said axially extending fingers extending axially from a connector end, proximate the connector body, to a distal end, distant from the connector body, and wherein the connector end of each axially extending finger is connected to the connector body by at least two radially separated discrete tabs, said discrete tabs forming an axial separation between the connector body and the connector end of the associated axially extending fingers;

a grommet axially coincident with the axially extending fingers, said grommet having a grommet bore communicating with the connector bore of the connector body permitting a cable to pass through the grommet bore and be received by the receiving opening of the connector bore; and wherein relative axial movement of the lock nut toward the connector body causes radial contraction of the axially extended fingers relative to the connector body to compress the grommet located axially coincident with the at least two axially extending fingers.

2. The cable connector as defined in claim 1, wherein each of the at least two axially extending fingers have a radially inward facing surface corresponding to a radially outward facing surface of the grommet so as to engage the radially outward facing surface of the grommet and compress the grommet when the lock nut moves axially towards the connector body.

3. The cable connector as defined in claim 2, wherein the grommet has a substantially tubular radially outer surface and the axially extending fingers have a radially inward arc shaped surface corresponding to the substantially tubular outer surface of the grommet.

4. The cable connector as defined in claim 3, wherein the at least two axially extending fingers consist of two identical radially arc shaped axially extending fingers located on opposed ends of the receiving opening and symmetrical about an axis perpendicular to a longitudinal axis of the cable connector; and wherein the at least two axially extending fingers are radially separated from each other and are adapted to move independently of each other with respect to the connector body.

5. The cable connector as defined in claim 2, wherein said connector body further comprises a ridge extending about the receiving opening, and, the radially separated discrete tabs are radially separated along the ridge for connecting the associated axially extending fingers to the ridge of the connector body at radially separated locations about the receiving opening.

6. The cable connector as defined in claim 2, wherein the axially extending fingers are initially at a first rest position, permitting insertion of the cable into the grommet bore, and axial movement of the lock nut towards the connector body causes radial contraction of the axially extending fingers from the first rest position to a second contracted position, where the axially extending fingers have translationally radially contracted to compress the grommet about the cable inserted in the connector.

7. The cable connector as defined in claim 6, wherein said connector body further comprises a ridge extending about the receiving opening, and, the radially separated discrete tabs are radially separated along the ridge for connecting the associated axially extending fingers to the ridge of the connector body at radially separated locations about the receiving opening, wherein, at the rest position, the radial arc shaped extending fingers are radially aligned with the ridge, and, the connector end of each of the axially extending fingers are substantially opposed from the ridge with the axial separation between the connector body and the connector end of the associated axially extending fingers defining a curved rectangular opening bordered by the ridge associated with the connector body, inner edges of the connecting tabs, and the connector end of the associated axially extending finger.

8. The connector cable as defined in claim 7, wherein axial movement of the lock nut towards the connector body causes the discrete radially separated tabs to resiliently radially inwardly deform permitting radial contraction of the associated axial extending finger from the first rest position to the second contracted position, with the distal end and connector end of the associated axially extending fingers radially contracted and the axial separation becoming an axial and radial separation between the connector body and the connector end of the associated axially extending fingers.

9. The cable connector as defined in claim 1, wherein the distal end of the radial fingers have a nut engagement surface and, wherein the lock nut has a first inner finger engagement surface and a second inner finger compression surface, axially separated from the first inner finger engagement surface, and wherein said first inner engagement surface is sized and shaped to independently engage the nut engagement surface of all of the axially extending fingers, and, the second finger compression surface is sized and shaped to contract the axially extending fingers about the grommet to compress the grommet.

10. The cable connector as defined in claim 9, wherein the lock nut comprises an axial tubular portion near a cable opening, and, wherein the axial tubular portion receives displaced excess material resulting from compression of the grommet.

11. The cable connector as defined in claim 1 wherein the grommet bore extends from a grommet cable opening for receiving a cable to a grommet exit opening and the grommet comprises a body engagement surface for engaging the connector body at a position axially coincident with the extending fingers, and, wherein the connector body comprises a grommet seat associated with the receiving opening for receiving the grommet at the position axially coincident with the axially extending fingers and with the grommet oriented with respect to the connector bore to permit a cable entering through the grommet cable opening to pass through the grommet bore, exit through the grommet exit opening and enter the receiving opening of the connector bore.

12. The cable connector as defined in claim 1, wherein the connector body, the at least two axially extending fingers and the at least two radially separate discrete tabs are integrally formed as part of a connector element.

13. The cable connector as defined in claim 2, wherein the grommet comprises a first flexible portion extending about the grommet bore for engaging an inserted cable.

14. The cable connector as defined in claim 1, wherein the grommet has a grommet bore for accommodating an inserted cable having a first size and shape, and, wherein the cable connector further comprises a second grommet having a second grommet bore, different from the grommet bore, said second grommet bore sized and shaped to accommodate a second inserted cable having a second size and shape different from the first size and shape of the inserted cable.

15. The cable connector as defined in claim 13, wherein the grommet comprises a second rigid portion radially remote from the grommet bore, wherein the first flexible portion has a first hardness for engaging the inserted cable and the second rigid portion has a second hardness, different from the first hardness, for engaging the axially extending fingers.

16. The cable connector as defined in claim 3, wherein the grommet comprises an integral grommet/insert combination having a first flexible portion about the grommet bore to engage the inserted cable, and, a second rigid portion forming the substantially tubular outer surface for engaging the axially extending fingers having a radial inward arc shaped surface;

wherein the second rigid portion is integrally formed with the first flexible portion to create a single integral grommet/insert combination.

17. A kit for a cable connector, said kit comprising:

a connector element having a connector body defining a connector bore extending therethrough from a receiving opening to an exiting opening, and at least two axially extending fingers, each of said axially extending fingers extending axially from a connector end, proximate the connector body, to a distal end, distant from the connector body, and wherein the connector end of each axially extending finger is connected to the connector body by at least two radially separated discrete tabs, said discrete tabs forming an axial separation between the connector body and the connector end of the associated axially extending fingers;

a lock nut for engaging the connector body and axially moveable relative to the connector body when engaged therewith;

a grommet axially coincident with the axially extending fingers, said grommet having a grommet bore communicating with the connector bore of the connector body permitting a cable to pass through the grommet bore and be received by the receiving opening of the connector bore; and wherein relative axial movement of the lock nut toward the connector body causes radial contraction of the axially extended fingers relative to the connector body to compress the grommet located axially coincident with the at least two axially extending fingers.

18. The kit as defined in claim 17, wherein the grommet has a grommet bore for accommodating an inserted cable having a first size and shape, and, wherein the cable connector kit further comprises a second grommet having a second grommet bore, different from the grommet bore, said second grommet bore sized and shaped to accommodate a second inserted cable having a second size and shape different from the first size and shape of the inserted cable; and wherein the first and second grommets each comprise a first flexible portion about the respective grommet bore and second grommet bore, respectively, to engage the respective inserted cable and second inserted cable, and, a second rigid portion forming a substantially tubular outer surface for interchangeably engaging a radially inward shaped surface of the axially extending fingers; and wherein the second rigid portion of each of the grommet and second grommet is integrally formed with the corresponding first flexible portion of the respective grommet and second grommet to create corresponding single integral grommet/insert combinations for the grommet and second grommet which can be interchangeably used with the connector element and lock nut.

19. The kit as defined in claim 17, wherein the axially extending fingers are initially at a first rest position, permitting insertion of the cable into the grommet bore, and axial movement of the lock nut towards the connector body causes radial contraction of the axially extending fingers from the first rest position to a second contracted position, where the axially extending fingers have translationally radially contracted to compress the grommet about the cable inserted in the connector; and wherein axial movement of the lock nut towards the connector body causes the discrete radially separated tabs to resiliently radially inwardly deform permitting radial contraction of the associated axial extending finger from the first rest position to the second contracted position, with the connector end of the associated axially extending fingers radially contracted and the axial separation becoming an axial and radial separation between the connector body and the connector end of the associated axially extending fingers.

20. The cable connector as defined in claim 1, wherein the axially extending fingers are initially at a first rest position, permitting insertion of the cable into the grommet bore, and axial movement of the lock nut towards the connector body causes radial contraction of the axially extending fingers from the first rest position to a second contracted position, wherein the axially extending fingers have translationally radially contracted to compress the grommet about the cable inserted in the connector; and wherein axial movement of the lock nut towards the connector body causes the discrete radially separated tabs to resiliently radially inwardly deform permitting radial contraction of the associated axial extending finger from the first rest position to the second contracted position, with the connector end of the associated axially extending fingers radially contracted and the axial separation becoming an axial and radial separation between the connector body and the connector end of the associated axially extending fingers.

* * * * *